US012764091B2

(12) United States Patent
Hsu

(10) Patent No.: US 12,764,091 B2
(45) Date of Patent: Oct. 13, 2026

(54) TOKENIZING USAGE RIGHTS OF AN ASSET

(71) Applicant: D3 Global, Inc., Las Vegas, NV (US)

(72) Inventor: Frederick Weider Hsu, Seattle, WA (US)

(73) Assignee: D3 Global, Inc., Las Vegas, NV (US)

( * ) Notice: Subject to any disclaimer, the term of this patent is extended or adjusted under 35 U.S.C. 154(b) by 0 days.

(21) Appl. No.: 18/651,165

(22) Filed: Apr. 30, 2024

(65) Prior Publication Data

US 2024/0372827 A1 Nov. 7, 2024

Related U.S. Application Data

(60) Provisional application No. 63/500,338, filed on May 5, 2023.

(51) Int. Cl.

*H04L 61/4511* (2022.01)
*H04L 9/32* (2006.01)
*H04L 61/3015* (2022.01)

(52) U.S. Cl.

CPC ........ *H04L 61/3025* (2013.01); *H04L 9/3213* (2013.01)

(58) Field of Classification Search

None
See application file for complete search history.

(56) References Cited

U.S. PATENT DOCUMENTS

| | | | |
|---|---|---|---|
| 10,467,536 B1 | 11/2019 | Lai et al. | |
| 11,188,977 B2 * | 11/2021 | Youb | G06Q 30/0645 |
| 11,558,344 B1 * | 1/2023 | Pezeshki | H04L 9/3247 |
| 12,147,978 B2 * | 11/2024 | Gauvreau, Jr. | G06Q 20/389 |
| 12,256,028 B2 * | 3/2025 | Quirk | H04L 9/3239 |
| 2015/0215271 A1 | 7/2015 | Gupta et al. | |
| 2016/0321752 A1 | 11/2016 | Tabacco et al. | |
| 2019/0318425 A1 | 10/2019 | Tilley et al. | |
| 2020/0021446 A1 | 1/2020 | Roennow et al. | |
| 2020/0051166 A1 | 2/2020 | Loh et al. | |
| 2021/0133875 A1 | 5/2021 | Foote et al. | |
| 2021/0158338 A1 * | 5/2021 | Lee | G06Q 20/223 |
| 2022/0131831 A1 | 4/2022 | Stahura et al. | |

* cited by examiner

*Primary Examiner* — Phuoc H Nguyen
(74) *Attorney, Agent, or Firm* — MLO, a professional corp.

(57) ABSTRACT

A method includes a processor receiving a request having an expression of interest from a computing device associated with a user. The expression of interest is for an intent to register a future domain name in a DNS. The future domain name is a domain name in a TLD that is not currently registered by a TLD registry. The processor determines an availability of the future domain name by querying on-chain databases and off-chain databases for occurrences of the future domain name. When the future domain name is available, the processor allocates usage rights to the expression of interest. The usage rights are associated with an account of the user. The processor generates a digital token for the expression of interest representing usage rights of the intent to register the future domain name in a future TLD registry. The processor records the digital token on a blockchain.

20 Claims, 13 Drawing Sheets

TOKENIZING USAGE RIGHTS OF AN ASSET

RELATED APPLICATIONS

This application claims priority to U.S. Provisional Patent Application No. 63/500,338 filed on May 5, 2023, which is hereby incorporated by reference in full.

BACKGROUND

A domain name is a unique address used to identify a specific website or resource on a network such as the Internet. Typically, a domain name serves as a substitute for the numerical IP address that computers use to locate each other over a network such as the Internet. Domain names consist of a series of character strings (labels) separated by periods (dots). Domain names normally end with a top-level domain (TLD), such as ".com", ".org" or ".net", and these TLD's are typically managed by a domain name registry. The combination of the TLD and a second-level domain (SLD) form a fully qualified domain name. For example, in the domain name "example.com", "example" is the SLD, and ".com" is the TLD.

The tokenization of a digital asset involves representing a physical or digital asset as a unique digital token on a blockchain or distributed ledger that enables easy transfer and token ownership verification. These tokens can then be traded or exchanged on various digital asset marketplaces. There is a need for a system to express interest in a future domain name in a secure, verifiable, and tradable framework, ensuring users have a reliable and standardized method to indicate and manage their interest in these emerging digital properties.

SUMMARY

In some embodiments, a method includes a processor in a platform receiving a request having an expression of interest from a computing device associated with a user. The expression of interest is for an intent to register a future domain name in a Domain Name System. The future domain name is a domain name in a top-level domain that is not currently registered by a top-level domain registry. The processor determines an availability of the future domain name by querying on-chain databases and off-chain databases for occurrences of the future domain name. The on-chain databases are comprised of data recorded on the blockchain and the off-chain databases are comprised of data recorded on the Domain Name System. When the future domain name is available, the processor allocates usage rights to the expression of interest. The usage rights are associated with an account of the user of the computing device. The processor generates a digital token for the expression of interest representing usage rights of the intent to register the future domain name in a future top-level domain registry. The processor records the digital token on a blockchain.

In some embodiments, a method includes a processor in a platform receiving a request to tokenize an existing domain name in a Domain Name System from a computing device associated with a user. The existing domain name is a domain name in a top-level domain that is currently registered by a top-level domain registry and is associated with a numerical IP address. The processor determines a legitimacy of the existing domain name by querying on-chain databases and off-chain databases for occurrences of the existing domain name. The on-chain databases are comprised of data recorded on a blockchain and the off-chain databases are comprised of data recorded on the Domain Name System. When the existing domain name is legitimate, the processor allocates usage rights to the existing domain name. The usage rights are associated with an account of the user of the computing device. The processor generates a digital token for the existing domain name representing the usage rights of the existing domain name in the top-level domain registry. The processor records the digital token on a blockchain.

DETAILED DESCRIPTION

Figure 1:
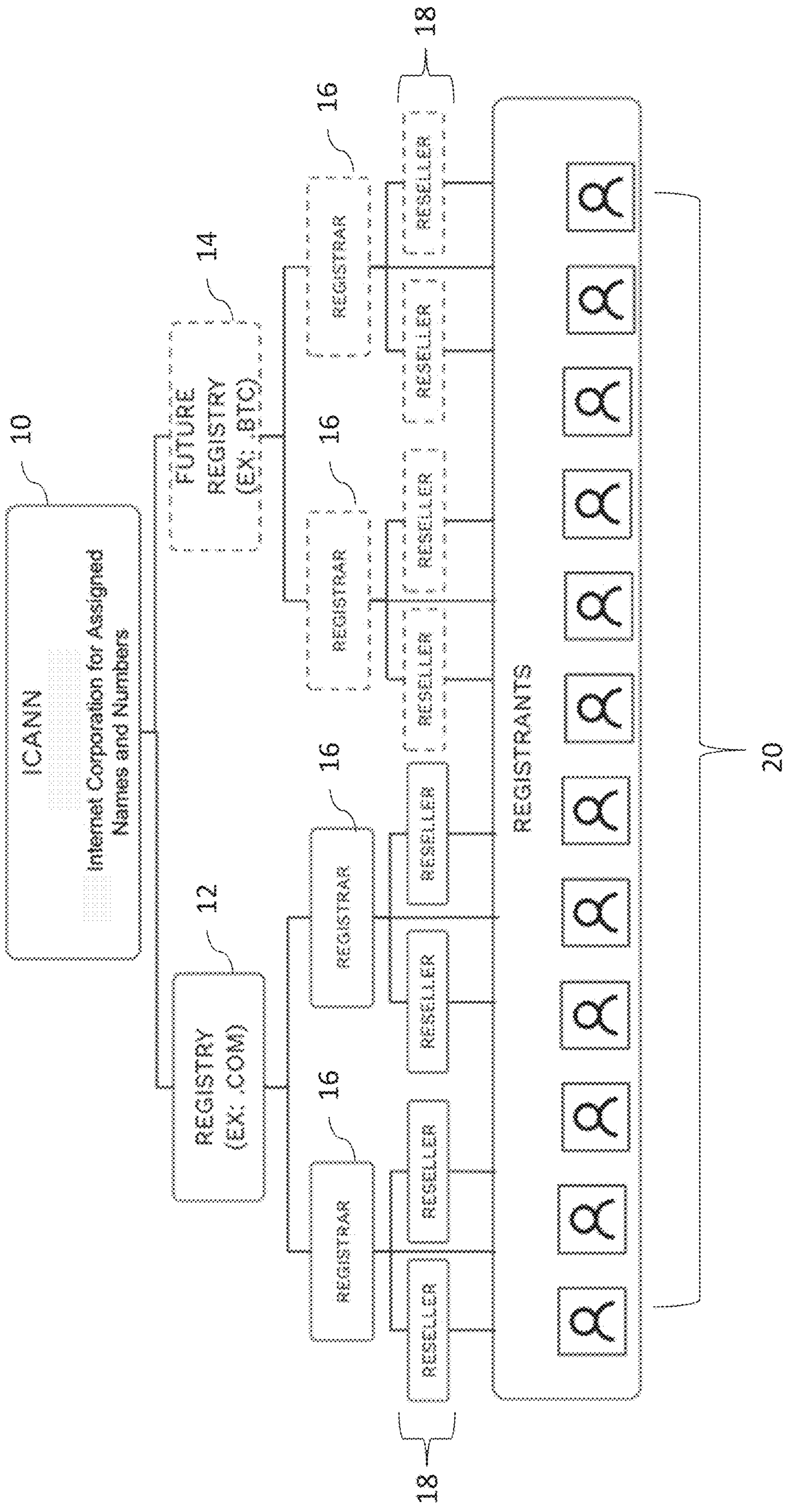
FIG. 1 (Prior Art)
FIG. 1 is a schematic of ICANN managing a DNS, as known in the art.

The present embodiments provide computer-implemented methods and systems for the tokenization of usage rights to a digital asset. The digital asset may be a digital token that is recorded in a decentralized system such as on a blockchain. Specifically, a user may be interested in obtaining a new domain name such as a website address or email identity before the top-level domain (TLD) is officially available. The present embodiments provide a method to claim an interest in that new domain name and "reserve a spot in line" to obtain the domain name when it is officially available. An Expression of Interest (EOI) is used as a formal communication expressing interest in acquiring the future domain name in a Domain Name System (DNS). The EOI is an intent to register a future domain name in a DNS, where the future domain name is a domain name in a TLD that is not currently registered by a TLD registry. When the TLD is approved such as by the Internet Corporation for Assigned Names and Numbers (ICANN), the future domain name will be assigned a numerical IP address that identifies and locates a specific web page, website, or resource on the World Wide Web, and will be registered in the DNS. The future domain name can be used on the Internet, such as in a web 1.0, web 2.0 or web 3.0 environment. The EOI is a digital placeholder or a declaration of intent of acquiring the future domain name. Instead of a mere list or database entry, this EOI becomes a digital token, providing a tangible representation of the intent of the user.

In this context, usage rights are used to describe that holders of a token may have various entitlements or privileges associated with it, whether that includes full control or more limited usage rights granted through a license. The usage rights may be license, usage rights and/or control. In some embodiments, the token may represent full usage rights, meaning the holder has complete control and authority over the token and its associated assets. The holder has the right to use, transfer, and dispose of the token as they see fit, without any restrictions imposed by a license agreement. In other embodiments, the token may grant specific permissions or rights to the holder but does not confer full usage. In this case, the holder has been granted certain privileges or permissions by the issuer of the token, typically outlined in a license agreement. These rights may include the ability to use, transfer, or access certain assets or functionalities associated with the token, subject to the terms and conditions specified in the license agreement.

It is known in the art that the prevalence of counterfeit, non-functional, and unlicensed domain names pose a serious threat to the stability of the Internet. Unregistered, fake domain names lack essential functionalities inherent in legitimate counterparts, including DNS compatibility, email services, and standard Internet website interoperability. These fake domain names are not registered with ICANN, offer limited utility, and run the risk of losing consumer interest and value. They cause user confusion, name collision, and the absence of governance and oversight within the broader context of the global Internet and its security infrastructure. Moreover, engaging with fake domains may lead to legal repercussions and substantial financial losses.

The Internet Corporation for Assigned Names and Numbers (ICANN) is the organization responsible for managing the global DNS. Web 2.0 describes the current state of the Internet and generally refers to the 21st-century Internet applications. FIG. 1 is a schematic of ICANN managing global DNS, as known in the art. The relationships between ICANN 206, a registry 12, a future registry 14 that is not yet implemented, registrars 16, resellers 18 and end user registrants 20 for domain names are depicted. Domain names are also normally registered through domain registrars 16, which coordinate with the domain name registries 12 (and/or future registry 14) to ensure that each unique domain name can be assigned to one holder of the right to receive services at that specific domain name.

The registry 12 (or future registry 14) is the authoritative database that maintains the registration information for a specific TLD and is responsible for managing and controlling the domain extension, including maintaining the master database of all registered domain names under that TLD, handling DNS queries, and implementing policies for domain registration within that extension. In use, once registered, the domain name is typically associated with a web server or other Internet resources via the DNS, which translates the domain name into an IP address so that computers can locate and access the associated website or resource. A new TLD is a recently introduced or newly approved generic or sponsored TLD added to the list of available TLDs in the DNS. New TLD are introduced to increase the variety of domain options, cater to specific industries or communities, and meet the growing demand for domain names.

The process of releasing new domain names to the public for registration typically involves the following steps of 1) Proposal and approval: Organizations, businesses, or communities can submit proposals for new TLDs to ICANN 10. ICANN 10 reviews the proposal from the TLD applicant (also referred to as a prospective registry such as future registry 14) and, if approved, the new TLD is added to the list of available TLDs; 2) Contracting and delegation: The TLD applicant with the approved new TLD is now a registry 12 and enters into a contract with ICANN 10 that outlines the terms and conditions for managing the TLD. ICANN 10 adds the new TLD to the DNS root zone which allows the TLD to become operational and accessible on the Internet. The TLD is delegated to the registry 12 which is responsible for managing the process of registering domain names within the TLD, operating and maintaining the DNS infrastructure for the TLD, maintaining a WHOIS database containing information about domain name registrations within the TLD, enforcing the policies and rules specific to the TLD, ensuring the technical stability, security, and reliability of the TLD's DNS services, among other duties.

The process continues with 3) Sunrise period: Before a new TLD becomes available for general registration, there is typically a "sunrise" period during which trademark holders can register domain names that match their trademarks. This period is intended to help brand owners protect their existing intellectual property rights; 4) Landrush period: After the sunrise period, some registries 12 may offer a "landrush" period during which interested parties can register domain names at a premium price. This phase allows users to secure highly desirable domain names before general registration begins; and 5) General availability: Once the sunrise and landrush periods are over, the new TLD becomes available for general registration on a first-come, first-served basis. At this point, registrants 20 (e.g., anyone) can register a domain name under the new TLD through a domain registrar 16 that is accredited with the TLD's registry 12 to make new TLD reservations available.

Most new TLD have their own release schedules and pricing structures, which can vary based on the registry 12 managing the TLD and a registrar 16 through which the domain name is registered. The registrar 16 is an entity authorized by the registry 14 to sell domain registrations to the public. Registrars 16 are intermediaries between individuals or organizations (registrants 20) and the registry 12, and facilitate the domain registration process, allowing users to search for, register, and manage domain names. Registrars 16 also handle the technical interaction with the registry 12 to update and maintain the registration information for the domains they manage. Resellers 18 are businesses or individuals who enter into agreements with accredited registrars 16 to sell domain names to registrants 20 (e.g., end-users). These resellers 18 essentially act as middlemen between registrants 20 and the registrars 16, and offer services, such as website hosting, email services, and technical support.

Figure 2:
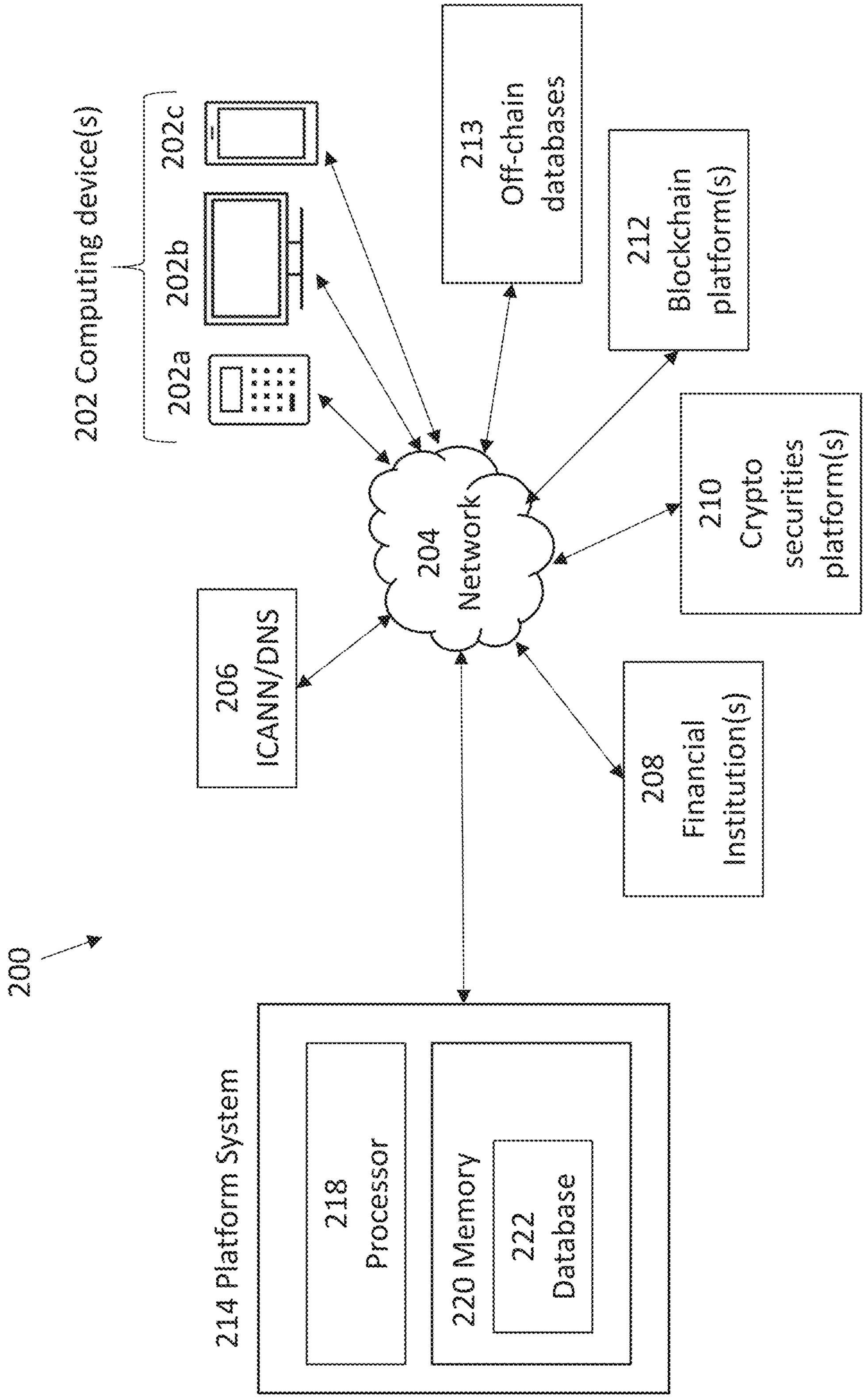
FIG. 2 is a schematic of an example of a network-based operating environment for tokenizing usage rights of an asset, in accordance with some embodiments.

FIG. 2 is a schematic of an example of a network-based operating environment 200 for tokenizing usage rights of an asset, in accordance with some embodiments. The operating environment 200 includes one or more computing devices 202 (such as 202*a*, 202*b*, 202*c* . . . 202*n*) such as a mobile device, mobile phone, tablet computer, mobile media device, mobile gaming device, vehicle-based computer, dedicated terminal, public terminal, desktop, laptop computer, or kiosk). The computing devices 202 are generally operative by users such as the registrant 20 which may be an individual, company, or organization. These computing devices 202 include mechanisms for receiving and sending communications by connecting through a network 204 to a variety of service providers such as ICANN 206, financial institution(s) 208, cryptocurrency securities platform(s) 210, blockchain platform(s) 212 and off-chain databases 213.

ICANN 206 oversees the manages the domain names and IP addresses to maintain the integrity and functionality of the Internet's addressing system. The financial institution(s) 208 manages financial transactions for a platform system 214. The cryptocurrency securities platform(s) 210 facilitates transparent and decentralized transactions for the platform system 214, allowing for the secure buying, selling, and trading of digital tokens in the marketplace. The blockchain platform(s) 212 is a decentralized and distributed digital ledger system that enables secure and transparent recording of transactions. It utilizes cryptographic techniques to ensure the immutability and integrity of data, eliminating the need for a central authority in managing and verifying transactions. Off-chain databases 213 refer to databases comprised of data or transactions that occur outside the blockchain such as the DNS or payment channels.

The computing devices 202 connect to the World Wide Web over the network 204. The network 204 generally represents any appropriate combination of the Internet, cell phone communication systems, broadband cellular networks, wide area networks (WANs), local area networks (LANs), wireless networks, networks based on the IEEE 802.11 family of standards (Wi-Fi networks), and other data communication networks.

In accordance with the description herein, the various components of the platform system 214 for tokenizing usage rights of an asset generally represent appropriate hardware and software components for providing the described resources and performing the described functions. The hardware generally includes any appropriate number and combination of computing devices, network communication devices, and peripheral components connected together, including various processors, computer memory (including transitory and non-transitory media), input/output devices, user interface devices, communication adapters, communication channels, etc. The software generally includes any appropriate number and combination of conventional and specially developed software with computer-readable instructions stored by the computer memory in non-transitory computer-readable or machine-readable media and executed by the various processors to perform the functions described herein.

The platform system 214 for tokenizing usage rights of an asset generally includes a processor 218 coupled to a memory 220 with data storage such as database 222. The processor 218 generally communicates with the components of the environment 200 through the network 204. The processor 218 generally represents one or more computerized devices, such as a cloud computing system, a server farm, a set of computers, a desktop computer, a notebook computer, among others. The memory 220 may be any device, mechanism, or populated data structure used for storing information. In accordance with some embodiments, the memory 220 stores executable instructions for running one or more applications or modules on the processor 218 and includes data storage for one or more databases 222. The data storage of the memory 220 may be implemented at least partially in a cloud network synchronized across multiple geolocations.

Figure 3:
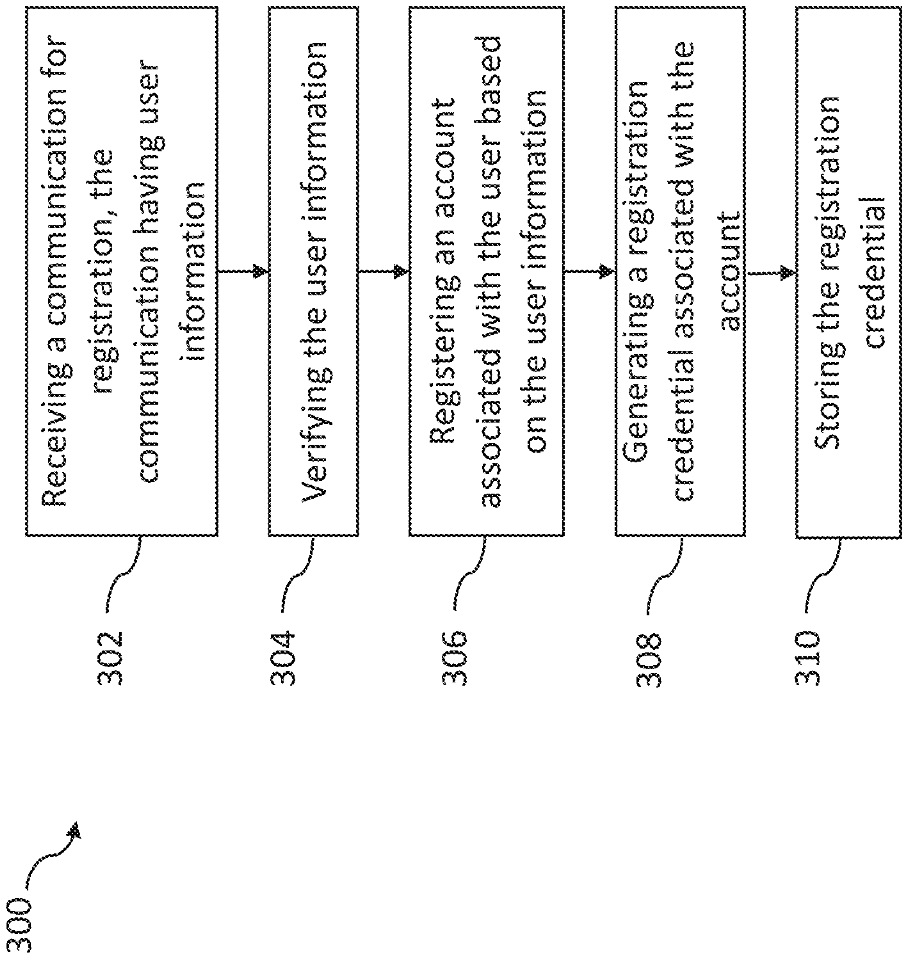
FIG. 3 is a process flowchart of a method for applying to a membership program supported by the platform system, in accordance with some embodiments.

FIG. 3 is a process flowchart of a method 300 for applying to a membership program supported by the platform system, in accordance with some embodiments. The particular steps, order of steps, and combination of steps are shown for illustrative and explanatory purposes only. Other embodiments can implement different particular steps, orders of steps, and combinations of steps to achieve similar functions or results. At block 302, the registrant 20 such as an individual or an organization requests registration in a membership program hosted by the platform system 214. The processor 218 of the platform system 214 receives a request or communication for registration from, for example, the computing device 202*a* associated with the registrant 20 (also known as the user). The request includes user information such as identification, proof of address, and other details.

At block 304, the processor 218 verifies the user information. It will be appreciated that methods known to the person skilled in the art may be used for the verification of the user information. If verified, identity verification credentials, such as "Know Your Customer" (KYC) are established for the registrant 20. If the processor 218 is unable to verify the user information, a rejection is transmitted to the computing device 202*a* of the registrant 20. When the user information is verified, then at block 306, the processor 218 registers an account associated with the registrant 20 based on the user information. At block 308, the processor 218 generates a registration credential associated with the account of the user and at block 310, the registration credential is stored. The registration credential associated with the account of the user enables that user to utilize the features of the platform system 214 including transmitting an EOI for an intent to register a future domain name in the DNS, transferring existing domain names to the platform system 214 for management of the domain name by the platform system 214, tokenizing existing domain names, exchanging digital tokens, and other features described herein.

A user may be interested in obtaining a new domain name such as a website address or email identity before the TLD is officially available. The present embodiments provide a method to claim an interest in that new domain name and reserve a spot in line to obtain the domain name when officially available. An Expression of Interest (EOI) is used as a formal communication expressing interest in acquiring the future domain name in a DNS. The future domain name is defined as a domain name in a TLD that is not currently registered by a TLD registry. The future domain name will later be assigned a numerical IP address that identifies and locates a specific web page, website, or resource on the World Wide Web, and will be registered in the DNS such as when approved by ICANN. The EOI is a digital placeholder or a declaration of intent of acquiring the future domain name. Instead of a mere list or database entry, this EOI becomes a digital token, providing a tangible representation of the intent of the user.

Figure 4:
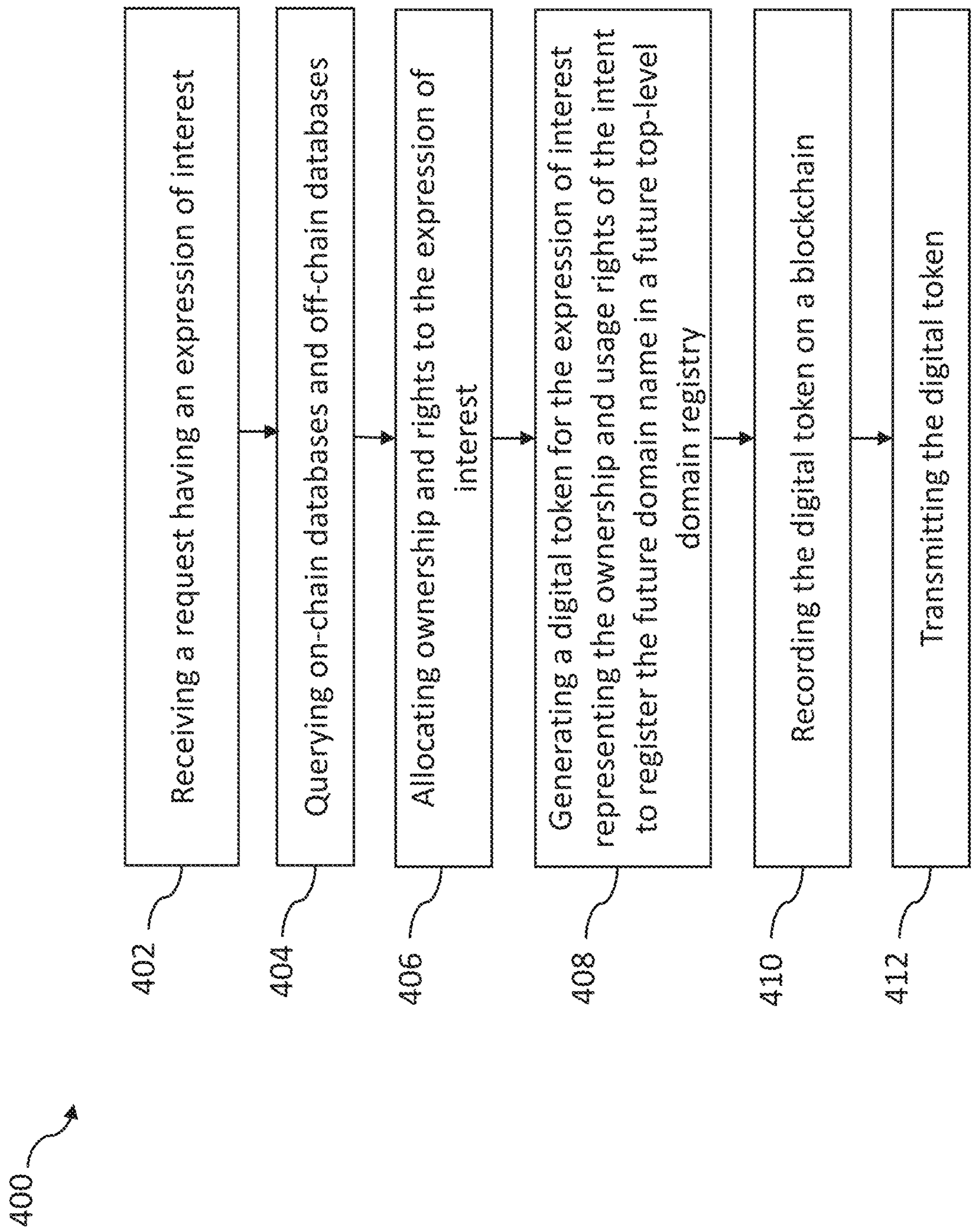
FIG. 4 is a flowchart of a method for tokenizing usage rights of an asset, in accordance with some embodiments.

FIG. 4 is a flowchart of a method 400 for tokenizing usage rights of an asset, in accordance with some embodiments. The particular steps, order of steps, and combination of steps are shown for illustrative and explanatory purposes only. Other embodiments can implement different particular steps, orders of steps, and combinations of steps to achieve similar functions or results. In some embodiments, the platform system 214 tokenizes usage rights of an EOI being for an intent to register a future domain name in a DNS. At block 402, the processor 218 receives a request from the computing device 202*a* associated with the registrant 20. The request includes an EOI and an account associated with the registrant 20. The EOI is a formal communication for the intent to register a future domain name in a DNS. The future domain name is defined as a domain name in a TLD that is not currently registered by a TLD registry or approved by ICANN 206. The future domain name will later be assigned a numerical IP address that identifies and locates a specific web page, website, or resource on the World Wide Web, and will be registered in the DNS after approval by ICANN 206 after an application window. This resolution is universal to all using the global DNS system.

The processor 218 may verify the account. For example, as described in method 300, the processor 218 determines if the account includes the registration credential to prove membership supported by the platform system. In some embodiments, when the account has the registration credential, the method 400 may proceed to block 404. At block 404, the processor 218 determines the availability of the future domain name in the EOI. The determining includes querying on-chain databases (blockchain platforms 212) and off-chain databases 213 for any existence of the future domain name. On-chain databases refer to data or transactions that are recorded directly on the blockchain or distributed ledger, and off-chain databases refer to data or transactions that occur outside the blockchain such as the DNS or payment channels. Domain blocklists or blacklists, are lists of domain names that are considered malicious, spammy, or otherwise undesirable are also consulted. These may be on-chain databases and/or off-chain databases. If no occurrences of the future domain name are found in the on-chain databases and the off-chain databases, then the future domain name is available.

At block 406, when the future domain name is available, the processor 218 allocates usage rights to the EOI. The usage rights are associated with the account of the registrant 20 of the computing device 202*a*. At block 408, the processor 218 generates a digital token (also known as a token) for the EOI representing the usage rights of the intent of the registrant 20 to register the future domain name in a future TLD registry. The digital token may be generated through smart contracts on a blockchain platform 212. In some embodiments, the platform system 214 may cooperate with the blockchain platform 212, a regulated entity or financial institution 208, or a specialized tokenization platform such as a cryptocurrency securities platform 210 to create the digital token. At block 410, the processor 218 records the digital token on the blockchain platform 212.

The blockchain platform 212 ensures that each digital token is secure, and protects the digital token against duplication, forgery, and any unauthorized changes. The digital token has a traceable lineage for the creation, exchanges, or modifications. The entire history is transparent and verifiable, assuring legitimacy. The recordation of the digital token on the blockchain platform 212 involves recording a unique identifier or hash that distinguishes it from other digital tokens, and information about the current owner is added to a record of all transactions involving the digital token, such as when the token was transferred, who the sender and receiver were, and any associated metadata, including timestamps. The smart contract associated with the digital token encodes the rules and conditions governing the token's behavior and may include rules for transfers, permissions, and other functionalities.

In the provided embodiments, a digital token is generated to correspond with the intention to register a domain name. This digital token serves to represent usage rights and is securely recorded on the blockchain. To ensure seamless compatibility and interaction with a variety of decentralized applications (dApps) and platforms, a standard token protocol may be used, including Ethereum ERC-20 or Ethereum, or other platforms such as BINANCE, SMART CHAIN, CARDANO, or SOLANA may also be used with the present embodiments.

Once a platform is selected, the token standard can be determined. Digital tokens may be fungible tokens or non-fungible tokens. For example, fungible tokens are uniform and can be exchanged on a one-to-one basis, and the ERC-20 standard is widely used. Non-fungible tokens are unique, non-interchangeable assets, and the ERC-721 or ERC-1155 standards are typically selected. In some embodiments, a smart contract can then be developed using a programming language like Solidity (for Ethereum-based tokens) that defines the token's properties such as the name and any desired functionalities according to the token's standard and including functions such as token creation, transfer, and management. Smart contracts can then be deployed to a blockchain network using a wallet that supports smart contract deployment, for example METAMASK or MYETHERWALLET.

At block 412, the digital token is transmitted to the computing device 202*a* of the registrant 20. Accordingly, the registrant 20 (e.g., user) maintains control and storage over the digital token which is an asset. The digital token may be stored locally such as on the computing device 202*a*, or remotely such as in a marketplace setting.

In a non-limiting example, a new TLD registry of .BTC is not yet approved by ICANN 206. The registrant 20 expresses an interest in acquiring a future domain name of RUNNING.BTC where "RUNNING" is the SLD, and ".BTC" is the TLD. The method 400 is executed with the EOI of RUNNING.BTC. In other words, the user would like to acquire the future domain name of RUNNING.BTC when .BTC is approved. A digital token is issued to the account associated with the registrant 20 being a tangible representation of an intent to register RUNNING.BTC (e.g., the future domain name). The digital token can serve as a reservation for when .BTC is approved by ICANN 206.

At a future date, ICANN 206 approves the TLD registry of .BTC and awards management of the .BTC to a registry, for example, registry 12*a*. In this example, ICANN 206 enters into a contract with the applicant or platform system 214 to delegate management of the new TLD. This contract outlines the rights and responsibilities of the TLD operator (e.g., platform system 214) and delegates authority over the TLD to the operator. This allows the TLD operator to begin accepting registrations for domain names under the new TLD. The digital tokens representing the usage rights of the intent to register the future domain name in a future top-level domain registry may be exchanged for the actual domain name. The platform system 214 becomes a registry or a registrar and controls the top-level domain registry. (and the on-chain databases). In some embodiments, the platform system 214 may also operate as the registrar 16 (see FIG. 1) while abiding by the rules as defined by ICANN 206 and/or other governing entities. The registry 12 (e.g., platform system 214) can issue and manage .BTC domain names.

At this time, the digital token representing the intent to register a domain name in .BTC may be redeemed for the domain name. In this example, the registrant 20 can redeem the digital token representing the intent to register RUNNING.BTC with the registry 12 for the domain name RUNNING.BTC. Because .BTC is approved by ICANN 206, the newly created domain name of RUNNING.BTC now has a numerical IP address that identifies and locates a specific web page, website, or resource on the World Wide Web, and is registered in the DNS. For example, the processor 218 of the platform system 214 from the computing device associated with the user, receives the digital token to register the future domain name in the registered top-level domain registry. The processor 218 registers the domain name associated with the digital token. In some embodiments, the platform system 214 is the registry or registrar and has the authority to initiate and complete a domain transfer process without requiring additional action or confirmation from the user based on prior authorization.

In some embodiments, the processor 218 determines a fee associated with the intent to register the future domain name in a future TLD registry. The fee may be based on demand for the future domain name, interest in the future domain name, promotions within the membership program, status of the future domain name such as new registration or transfer, among other factors. An invoice for the fee is transmitted by the processor 218 to the computing device 202*a* of the registrant 20. The invoice may be paid by the registrant 20 though the financial institution 208 or the cryptocurrency securities platform 210.

The present embodiments may be executed to designate the platform system 214 as the registrar 16 of an existing domain name in the current DNS environment. An existing domain name is defined as having a numerical IP address that identifies and locates a specific web page, website, or resource on the World Wide Web, and is registered in the DNS. In this scenario, the existing domain name is managed by another registrar 16 that is not the platform system 214. The processor 218 may receive a request from the computing device 202*a* of the registrant 20. The request includes an account associated with the user and an application for transferring an existing domain name to the platform system 214 for management. The application includes the existing domain name and an authorization code associated with the existing domain name. The authorization code is a security measure to ensure that only the domain owner or an authorized person can initiate the transfer. In some embodiments, the processor 218 verifies the account associated with the user by determining if the account includes the registration credential, as described in method 300. If the registration credential is present, the account is verified.

Next, the processor 218 determines the legitimacy of the existing domain name by querying on-chain databases and off-chain databases 213 to determine any existence of the existing domain name. If the existing domain name is found, the existing domain name is legitimate, and the contact information is retrieved. When the existing domain name is legitimate, the processor 218 adds the existing domain name to the registry and transmits a confirmation to the computing device 202*a* of the registrant 20. In some embodiments, a fee is required.

The present embodiments may be implemented to tokenize an existing domain name in the current DNS environment. The digital token represents usage rights of the existing domain name and can be exchanged in the marketplace of the platform system 214. The processor 218 may receive a request from the computing device 202*a* of the registrant 20. The request includes an account associated with the user (e.g., registrant 20) and an application for tokenizing an existing domain name. The application includes the existing domain name and data associated with the existing domain name such as a numerical IP address. As described herein, the processor 218 verifies the account associated with the user (e.g., method 300) and determines the legitimacy of the existing domain name. When the existing domain name is legitimate, the processor 218 allocates usage rights to the existing domain name.

The usage rights are associated with the account of the registrant 20 of the computing device 202*a*. The processor 218 generates a digital token representing the usage rights of the existing domain name. Similar to block 408, the digital token may be generated through smart contracts on a blockchain platform 212. In some embodiments, the platform system 214 may cooperate with other platforms to create the digital token. The processor 218 records the digital token on the blockchain platform 212, where the digital token represents usage rights of the existing domain name. The digital token is an asset and is transmitted to the computing device 202*a* of the registrant 20. As such, the digital identity of the existing domain name is secured with enhanced utility, security and universal access on the Internet infrastructure.

In some embodiments, the EOI may be made as a present or a future reservation of rights. The digital token may be distributed to another party, traded, sold, or exchanged directly with another registrant 20 or indirectly via a marketplace. Marketplaces are online platforms where users can purchase, sell or trade tokens representing various digital assets. These marketplaces can be centralized or decentralized, and the tokens available may be fungible or non-fungible. The platform system 214 manages assets in a decentralized network by including a marketplace which enables digital tokens to be exchanged, traded, bought or sold. The present embodiments may be implemented to buy, sell or trade digital tokens within the platform system 214 such as through the marketplace. The registrant 20 may utilize various features of the marketplace of the platform system 214 such as buying, selling and trading digital tokens. This allows users to expand their digital asset portfolio for investments and diversification strategies. The registrant 20 can increase their digital token holdings or liquidate assets when needed, and by trading digital tokens, the registrant 20 can take advantage of price fluctuations, market trends, and other opportunities.

Figure 5A:
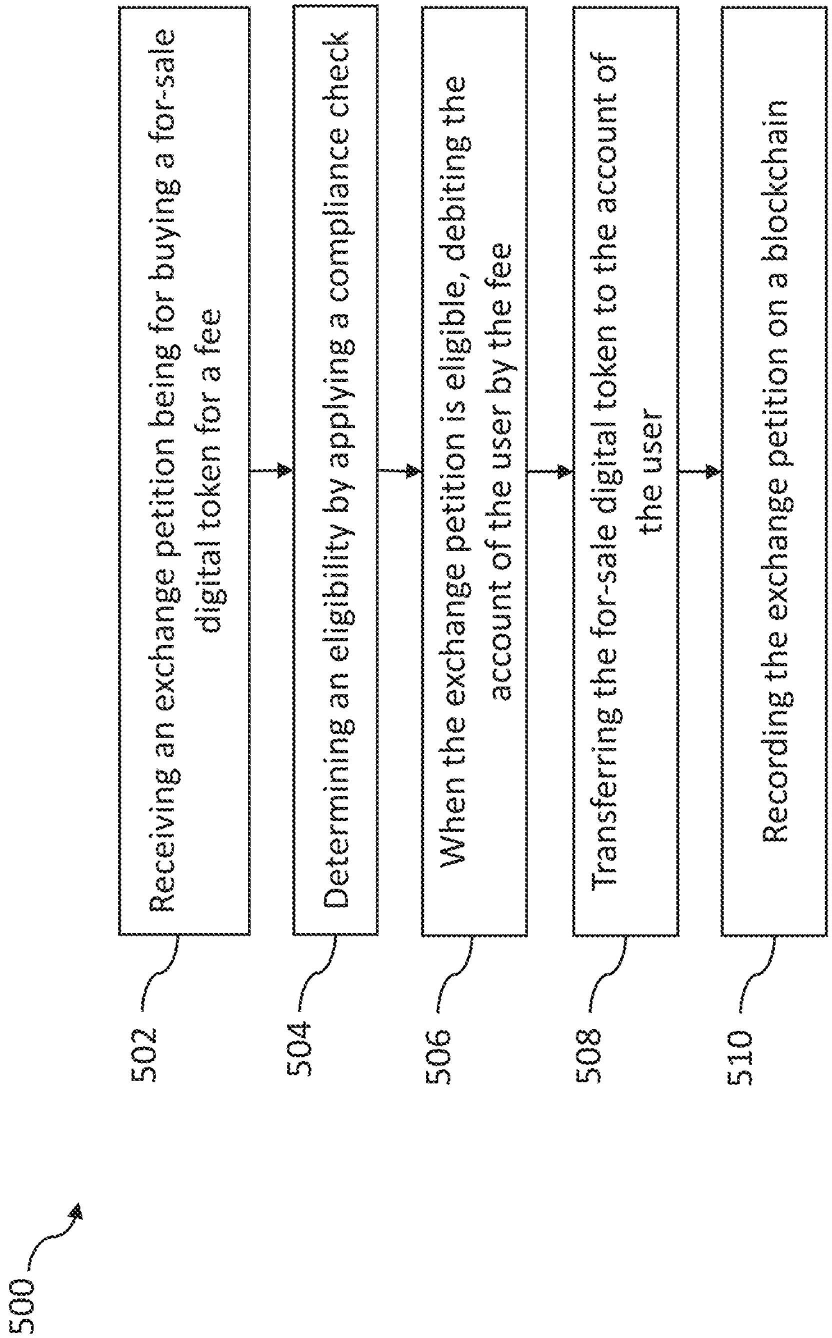
FIG. 5A is a flowchart for a method for buying a digital token in the marketplace, in accordance with some embodiments.

The digital tokens, as described herein, represent the usage rights of an asset. The assets have been described herein as an intent to register the future domain name in a future TLD registry and, in some embodiments, as an existing domain name. FIG. 5A is a flowchart for a method 500 for buying a digital token in the marketplace, in accordance with some embodiments. The particular steps, order of steps, and combination of steps are shown for illustrative and explanatory purposes only. Other embodiments can implement different particular steps, orders of steps, and combinations of steps to achieve similar functions or results.

At block 502, the processor 218 receives from the computing device 202*a* associated with the registrant 20, a communication having the account associated with the registrant 20 and an exchange petition. The exchange petition is for buying a for-sale digital token for a fee listed on the marketplace. For example, registrants 20 may use the marketplace to post information about digital tokens for sale or trade, or for wanted digital tokens (e.g., would like to purchase). This may be a Buy-It-Now listing with a reserve price. The for-sale digital token represents usage rights of the intent to register the future domain name in a future TLD registry. The for-sale digital token listing may be posted directly by another user, on behalf of another user, or by the platform system 214.

The processor 218 may verify the account of the user as described in method 300. At block 504, the processor 218 determines an eligibility of the exchange petition by applying a compliance check. Namely, the processor 218 may determine that the transaction of buying the for-sale digital token aligns with relevant regulations and internal policies, may confirm available funds for the purchase, may confirm that the seller has the digital token available for sale, may consult smart contracts for chain of command, and may calculate and apply administration fees. At block 506, when the exchange petition is eligible, the processor 218 may debit the account of the user associated with the computing device 202*a* by the fee. The fee is the cost of the for-sale digital token and may include the administration fec. At block 508, the processor 218 transfers the for-sale digital token to the account of the registrant 20. At block 510, the processor 218 records the exchange petition on a blockchain.

Figure 5B:
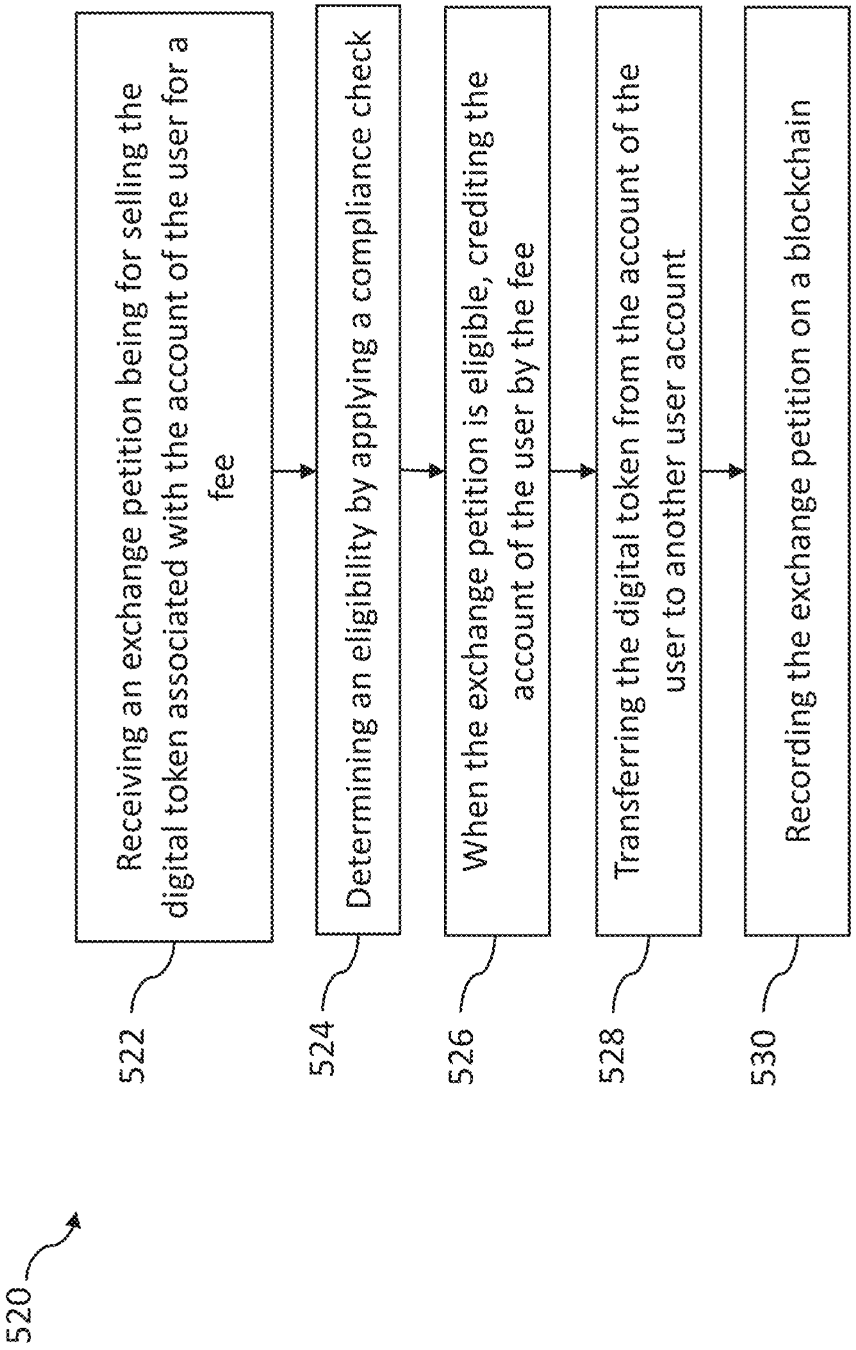
FIG. 5B is a flowchart for a method for selling a digital token in the marketplace, in accordance with some embodiments.

FIG. 5B is a flowchart for a method 520 for selling a digital token in the marketplace, in accordance with some embodiments. The particular steps, order of steps, and combination of steps are shown for illustrative and explanatory purposes only. Other embodiments can implement different particular steps, orders of steps, and combinations of steps to achieve similar functions or results. At block 522, the processor 218 receives from the computing device 202*a* associated with the registrant 20, a communication having the account associated with the registrant 20 and an exchange petition. The exchange petition is for selling the digital token associated with the account of the user for a fec. The digital token represents usage rights of the intent to register the future domain name in a future TLD registry. The digital token for sale listing may be posted directly by the user, on behalf of the user, or by the platform system 214.

The processor 218 may verify the account of the user as described in method 300. At block 524, the processor 218 determines an eligibility of the exchange petition by applying a compliance check as described in block 504. At block 526, when the exchange petition is eligible, the processor 218 may credit the account of the user by the fee. In some embodiments, the processor 218 may debit the account of the user by the administration fee. At block 528, the processor 218 transfers the digital token from the account of the registrant 20 to another user account to complete the sale. At block 530, the processor 218 records the exchange petition on a blockchain.

Figure 5C:
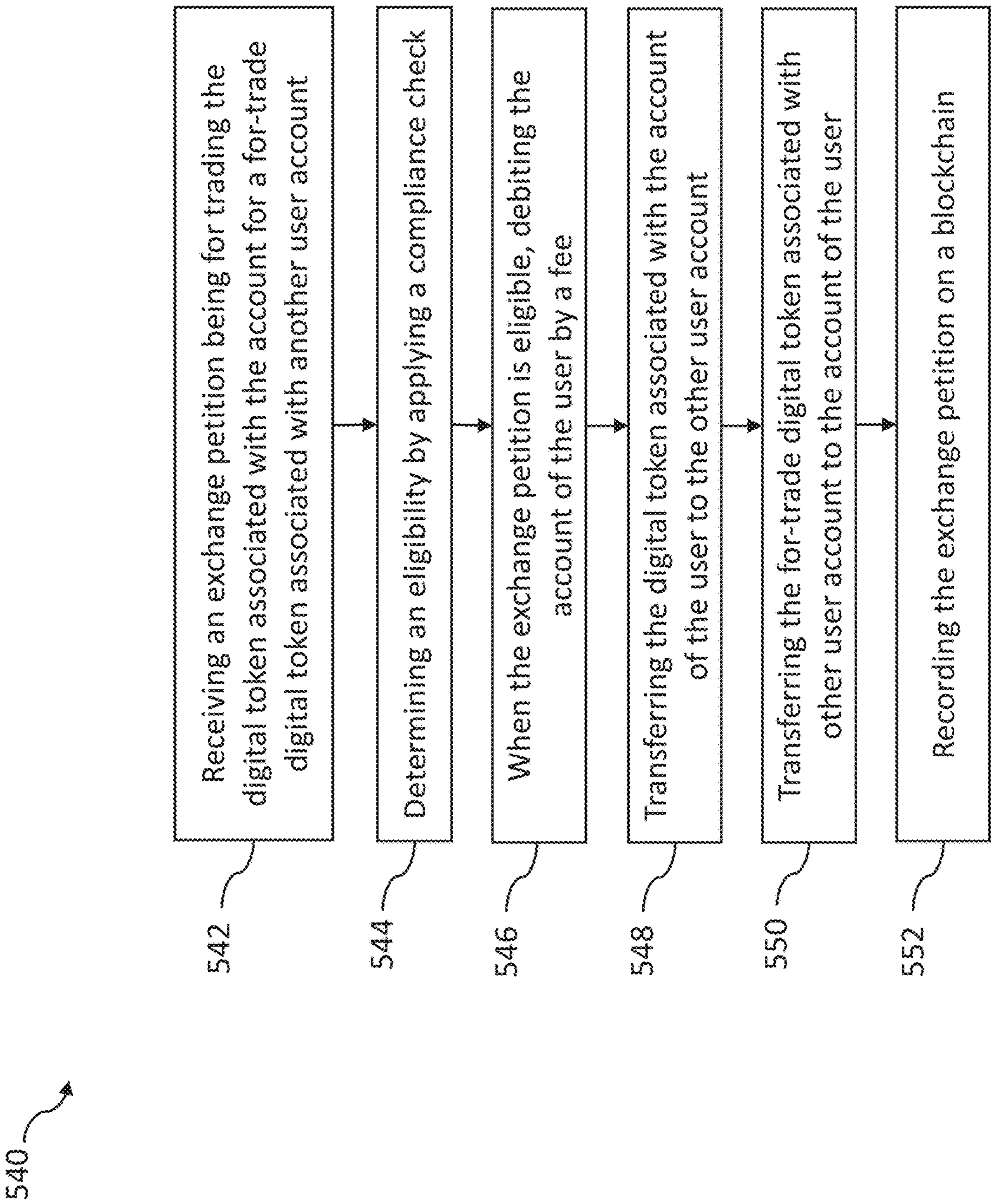
FIG. 5C is a flowchart for a method for trading digital tokens in the marketplace, in accordance with some embodiments.

FIG. 5C is a flowchart for a method 540 for trading digital tokens in the marketplace, in accordance with some embodiments. The particular steps, order of steps, and combination of steps are shown for illustrative and explanatory purposes only. Other embodiments can implement different particular steps, orders of steps, and combinations of steps to achieve similar functions or results. At block 542, the processor 218 receives from the computing device 202*a* associated with the registrant 20, a communication having the account associated with the registrant 20 and an exchange petition. The exchange petition is for trading the digital token associated with the account of the registrant 20 for a for-trade digital token associated with another user account such as a second user account. The digital token and the for-trade digital token represent usage rights of the intent to register the future domain name in a future TLD registry. The digital token for trade listing may be posted directly by the user, on behalf of the user, or by the platform system 214. Effectively, in some embodiments, the registrant 20 is trading one of their digital tokens for a future domain name for another digital token with a different future domain name.

The processor 218 may verify the account of the user as described in method 300. At block 544, the processor 218 determines an eligibility of the exchange petition by applying a compliance check as described in block 504. At block 546, when the exchange petition is eligible, the processor 218 may debit the account of the user by a fee and debit the account of the second user by the fee. This fee may be an administration fee for the trade. At block 548, the processor 218 transfers the digital token associated with the account of the registrant 20 to the second user account. At block 550, the processor 218 transfers the for-trade digital token associated with the second user account to the account associated with the registrant 20. At block 552, the processor 218 records the exchange petition on a blockchain.

Figure 5D:
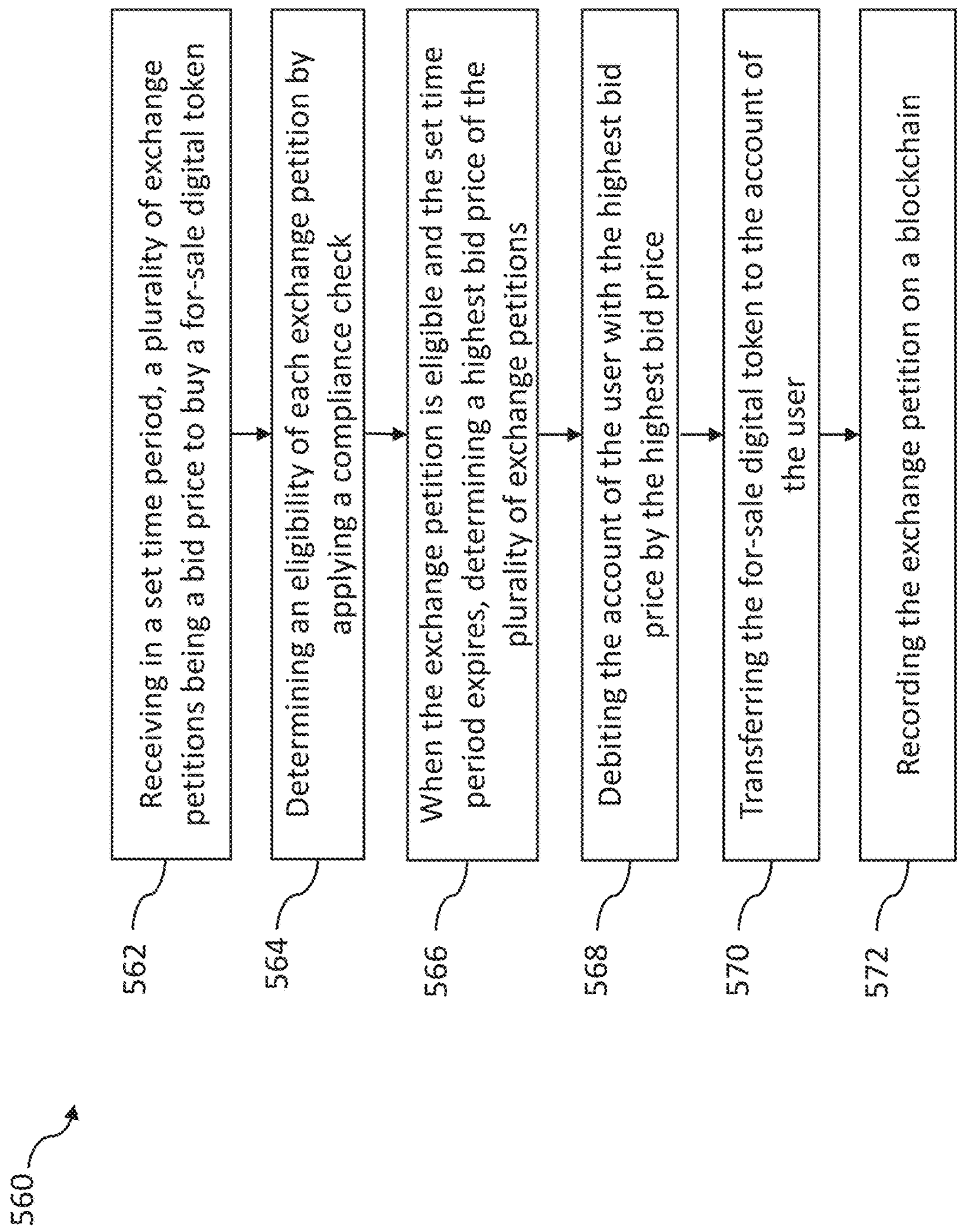
FIG. 5D is a flowchart for a method for an auction for a for-sale digital token in the marketplace, in accordance with some embodiments.

The marketplace may conduct auctions for exchanging digital tokens. This creates a competitive environment where buyers may determine the value of the for-sale digital token based on their bid price, fostering a dynamic marketplace. FIG. 5D is a flowchart for a method 560 for an auction for a for-sale digital token in the marketplace, in accordance with some embodiments. The particular steps, order of steps, and combination of steps are shown for illustrative and explanatory purposes only. Other embodiments can implement different particular steps, orders of steps, and combinations of steps to achieve similar functions or results.

At block 562, the processor 218 receives from a plurality of computing devices 202 associated with a plurality of users (e.g., a plurality of registrants), in a set time period, a plurality of exchange petitions. Each exchange petition is a bid price associated with a user to buy a for-sale digital token listed on the marketplace. The for-sale digital token represents usage rights of the intent to register the future domain name in a future TLD registry. The auction for the for-sale digital token listing may be posted directly by another user, on behalf of another user, or by the platform system 214.

The processor 218 may verify the account of the user as described in method 300. At block 564, the processor 218 determines an eligibility of the exchange petition by applying a compliance check as described in block 504. At block 566, when the exchange petition is eligible and the set time period expires, the processor 218 determines a highest bid price of the plurality of exchange petitions. Put another way, when the time period for the auction expires, the processor 218 determines the highest bid price that was submitted through the exchange petitions by the plurality of users. At block 568, the processor 218 debits the account of the user with the highest bid price by the highest bid price. The processor 218 may also debit the account of the user with the highest bid price by an administration fec. At block 570, the processor 218 transfers the for-sale digital token to the account of the user with the highest bid. At block 572, the processor 218 records the exchange petition on a blockchain.

In some embodiments, for the auction, each user may set a maximum bid price and the processor 218 automatically increases the bid price on their behalf, ensuring they remain the highest bidder until their limit is reached. In some embodiments, the auction may have a reserve price which is a hidden minimum amount that must be met for the for-sale digital token to be sold. If the reserve isn't met, the for-sale digital token may not be sold. In some embodiments, the auction may provide a Buy-It-Now option, allowing users to buy the for-sale digital token immediately at a set price, ending the auction before the set time period expires.

In some embodiments, a portion of administration fees generated through marketplace transactions are distributed to active members on the platform system 214. This may be a loyalty and rewards strategy for members in the membership program hosted by the platform system 214.

Figure 6:
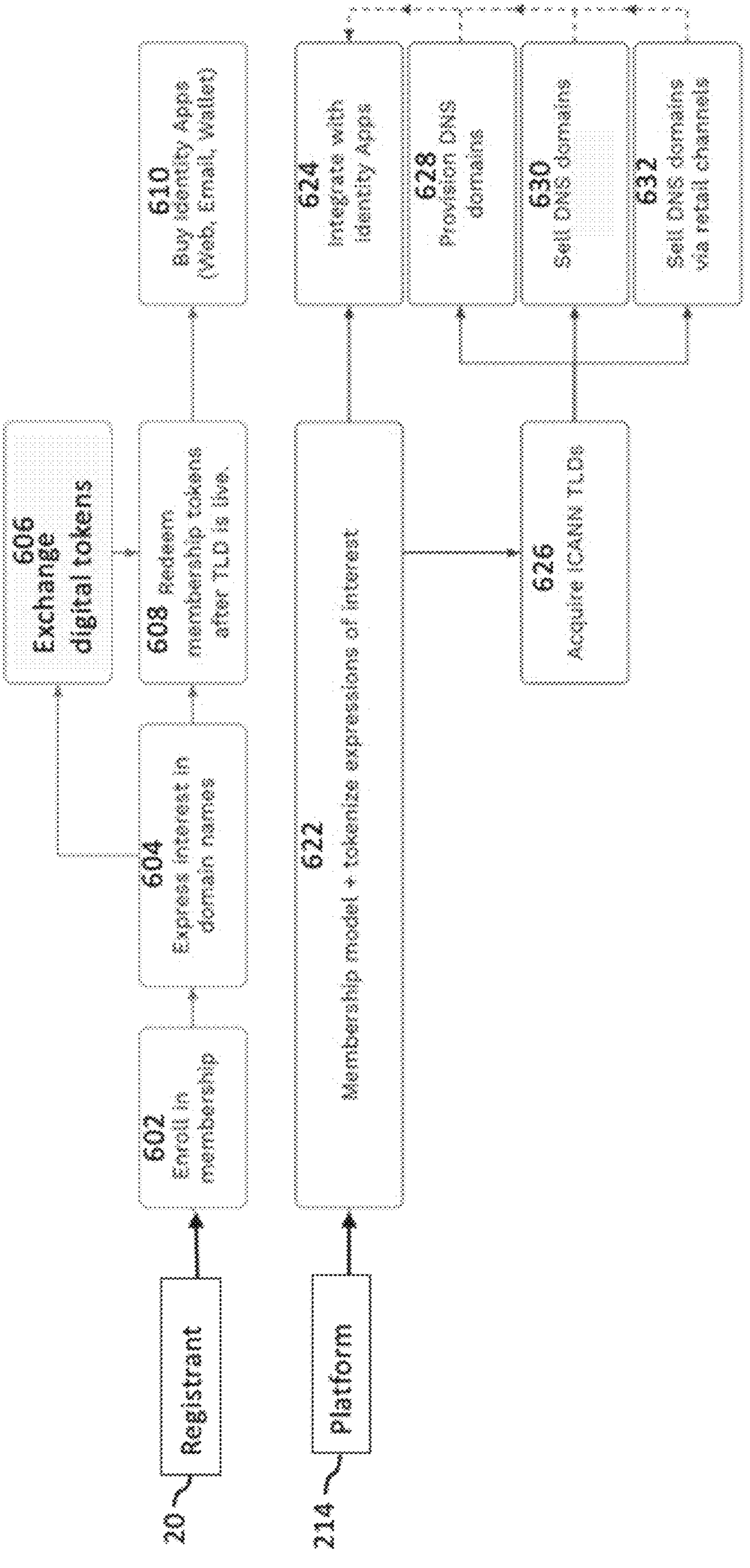
FIG. 6 is a flowchart for actions within the platform system, in accordance with some embodiments.

FIG. 6 is a flowchart for actions within the platform system, in accordance with some embodiments. For the registrant 20, at block 602, the registrant 20 enrolls in the membership program within the platform system 214. This process is described by the method 300 for applying to a membership program. At block 604, the registrant 20 may utilize the present embodiments to express interest in acquiring a future domain name in a TLD of the DNS by submitting an EOI as described in method 400 (FIG. 4). At block 606, the registrant 20 may use the marketplace to buy, sell and trade digital tokens as described in method 500 (FIG. 5A), method 520 (FIG. 5B), method 540 (FIG. 5C) and method 560 (FIG. 5D). At block 608, once the TLD is live, such as when approved by ICANN 206, the digital tokens for the EOI representing usage rights of the intent to register the future domain name in a future top-level domain registry, can be redeemed or exchanged for the domain name. At block 610, once the digital token is redeemed for a domain name by the registrant 20, the registrant 20 can obtain services within the marketplace or at another service provider. These services may be fee based and can include Identity Applications, Website hosting, email services, and wallet services.

For the platform system 214, at block 622, the platform system 214 manages tokenizing assets such as an intent to register the future domain name in a future TLD registry or for tokenizing an existing domain name. At block 624, the platform system 214 may integrate with Identity Applications to enhance security, streamline processes, and ensure efficient management of user identities and access rights. At block 626, in some embodiments, ICANN 206 approves a TLD registry and awards management of the TLD registry to the platform system 214. The platform system 214 becomes the registry 12. At block 628, DNS domains may be provisioned to specify how domain names should be mapped to IP addresses and handle email routing. At block 630, the platform system 214 may sell DNS domains, and at block 632, the platform system 214 may sell DNS domains through retail channels.

In some embodiments, the platform system 214 may issue digital tokens for EOIs of domain names in which required fees associated with the domain name have not been paid. Generally, domain names are required to be renewed annually by the current registrant by paying fees. Otherwise, the domain name is released back into the available pool of available domain names where they can be registered again on a first come, first served basis. In some embodiments, digital tokens may be purchased so that a registrant can acquire the usage rights of an existing domain name registration should that registration not be renewed by the prior domain name registrant. In some embodiments, digital tokens may be purchased for the usage rights to a domain name yet to be released and/or a domain name that may not be renewed in the future. In one example, a portfolio of domain names in a registry may be sold as a group of more than one digital token.

Figure 7A:
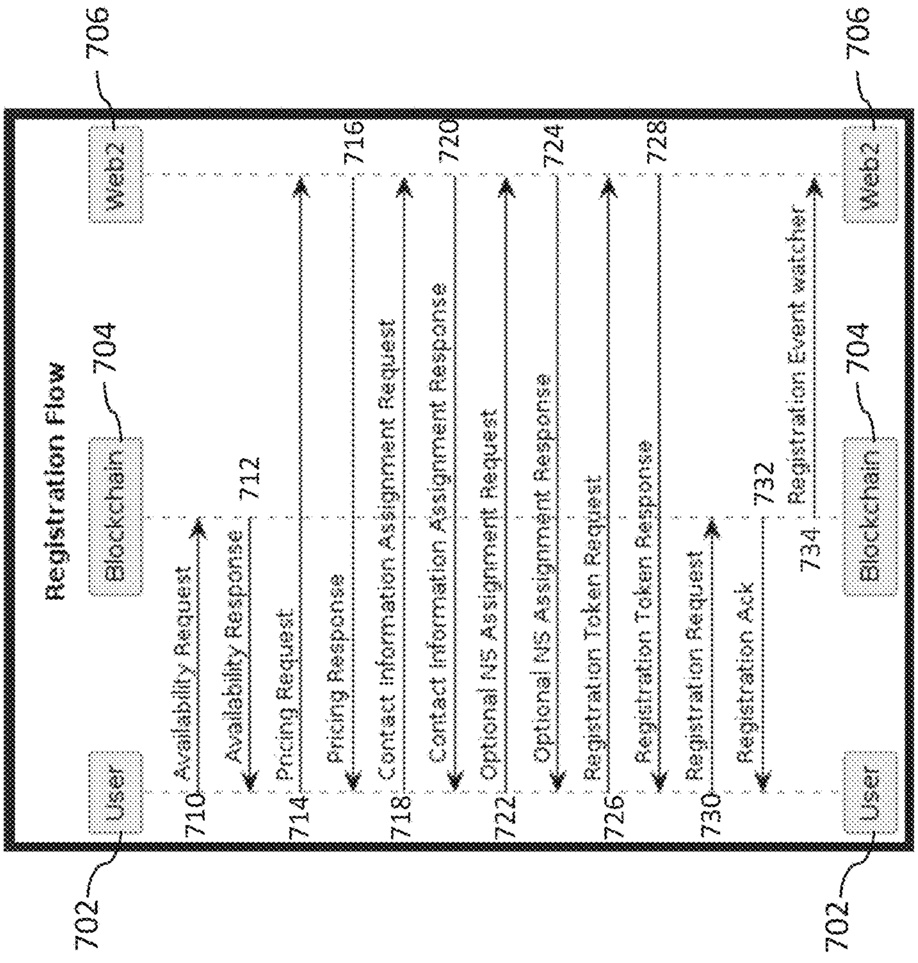
FIG. 7A is a flowchart for registration flow of a domain name, in accordance with some embodiments.

FIG. 7A is a flowchart for registration flow of a domain name, in accordance with some embodiments. The particular steps, order of steps, and combination of steps are shown for illustrative and explanatory purposes only. Other embodiments can implement different particular steps, orders of steps, and combinations of steps to achieve similar functions or results. At block 710, a user 702 may transmit an availability request for a future domain name in a TLD that is not currently registered by a TLD registry (such as an EOI) or that is currently registered by TLD registry. In this example, the TLD registry is currently registered and the platform system 214 is the registry 12. The registry 12 is the controlling body of the TLD and receives the availability request. At block 712, the availability of the future domain name is determined by querying on-chain databases at blockchain 704 and off-chain databases for any existence of the future domain name. Domain blocklists or blacklists, in on-chain databases and off-chain databases, are also checked. If no occurrences of the future domain name are found in the on-chain databases and the off-chain databases, then the future domain name is available. At block 714, a pricing request is transmitted to the registry supported by web 2.0 706 to inquire the cost of registration for the future domain name. The prices may vary based on factors such as the domain extension and premium features offered by the registry. At block 716, the pricing response is communicated to the user 702.

At block 718, a contact information assignment request is made to register the domain name with a registrar to specify the name servers that will be responsible for managing the domain name records associated with the domain name. At block 720, the contact information assignment response is transmitted to the user 702. At block 722, optionally, a name server (NS) assignment request may be transferred through web 2.0. In this request, the name server associated with a particular domain may be assigned or updated. This ensures that DNS queries for the domain are directed to the correct name servers where DNS records are managed. At block 724, the name server assignment response is transmitted to the user 702.

At block 726, the user 702 requests a registration token of the domain name to verify usage rights of the domain name. At block 728, the token is transmitted to the user 702. At block 730, the transaction is recorded on the blockchain and at block 732, the acknowledgement and token are transmitted to the user 702. At block 734, an event watcher monitors the blockchain 704 for any modification to the domain name such as creation, transfer, renewal, contact update, or the like, and is communicated through Extensible Provisioning Protocol (EPP). EPP is a protocol used in the domain name registration and management industry to enable communication between domain registrars and domain registries.

Figure 7B:
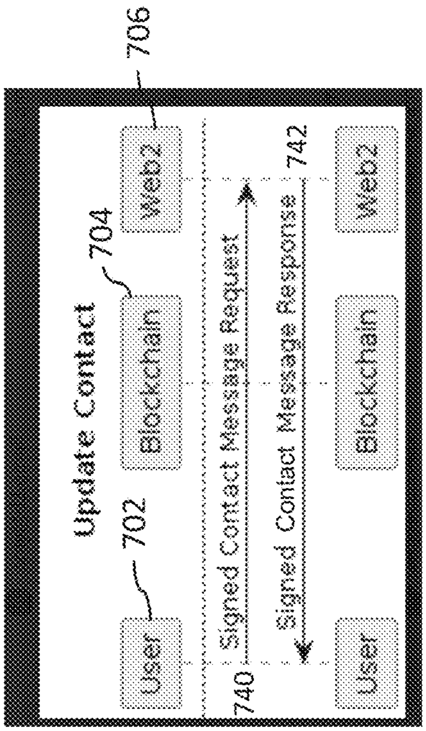
FIG. 7B is a flowchart for updating a contact with a registry, in accordance with some embodiments.

FIG. 7B is a flowchart for updating a contact with a registry, in accordance with some embodiments. The particular steps, order of steps, and combination of steps are shown for illustrative and explanatory purposes only. Other embodiments can implement different particular steps, orders of steps, and combinations of steps to achieve similar functions or results. To keep Personally Identifiable Information (PII) off the blockchain, at block 740, a signed contact message request is transmitted through a web 2.0 API to update contact information including the registrant, administrative, technical, or billing contact, associated with a domain name. At block 742, a signed contact message response is received by the registry (e.g., the platform system 214) and saved in the database for compliance with ICANN 206. This allows the contact information to be private and off the blockchain.

Figure 7C:
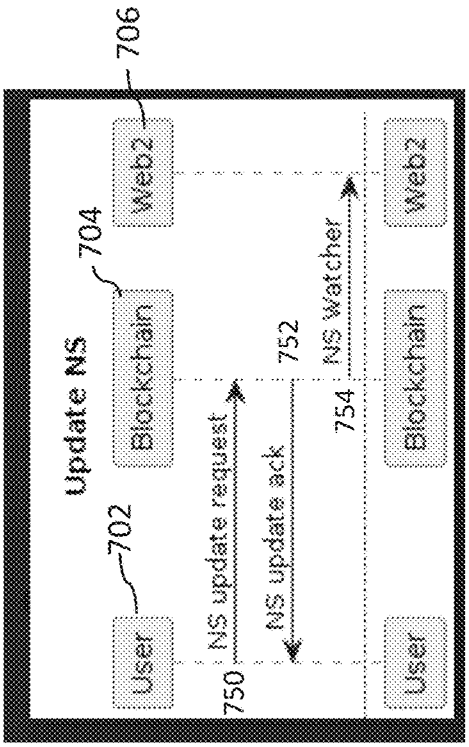
FIG. 7C is a flowchart for updating a name server with a registry, in accordance with some embodiments.

FIG. 7C is a flowchart for updating a name server with a registry, in accordance with some embodiments. The particular steps, order of steps, and combination of steps are shown for illustrative and explanatory purposes only. Other embodiments can implement different particular steps, orders of steps, and combinations of steps to achieve similar functions or results. In this embodiment, the registry is the platform system 214. To update a name server with blockchain manipulation of the domain name post tokenization, the digital token of the domain name allows the user to irrefutably prove usage rights of the domain name granting the authority to change the name server. At block 750, the user 702 transmits a name server update request for a domain name. For example, the user 702 may want to change from one name server to another. At block 752, the name server update request is executed and recorded on the blockchain 704. A name server update acknowledgement is transmitted to the user 702. At block 754, a name server watcher is implemented to monitor the blockchain 704 for any modification to the name server for the domain name and transmit it to the registry. In this way, the user having the digital token for the domain name can make changes outside of the registry (e.g., the platform system 214) and the name server watcher informs the registry of the modifications.

In some embodiments, the digital token representing the domain name (e.g., tokenized domain) serves as a bearer instrument such that the owner of the tokenized domain has the right to transfer or manipulate the associated domain name without requiring additional authorization from centralized authorities. This allows better liquidity for sales or trades. For example, holders of tokenized domains may move or manipulate the domain names such as transferring usage and control of the domain, updating registration details, or performing other actions related to domain management. These actions may be recorded on the blockchain.

In some embodiments, the tokenized assets may be manipulated on the blockchain. The manipulation may be a sale or changing a DNS, adding wallet records, updating contacts, manipulating Digital identity and other aspects. This can be accomplished by using the tokenized domain as a bearer instrument.

Figure 8:
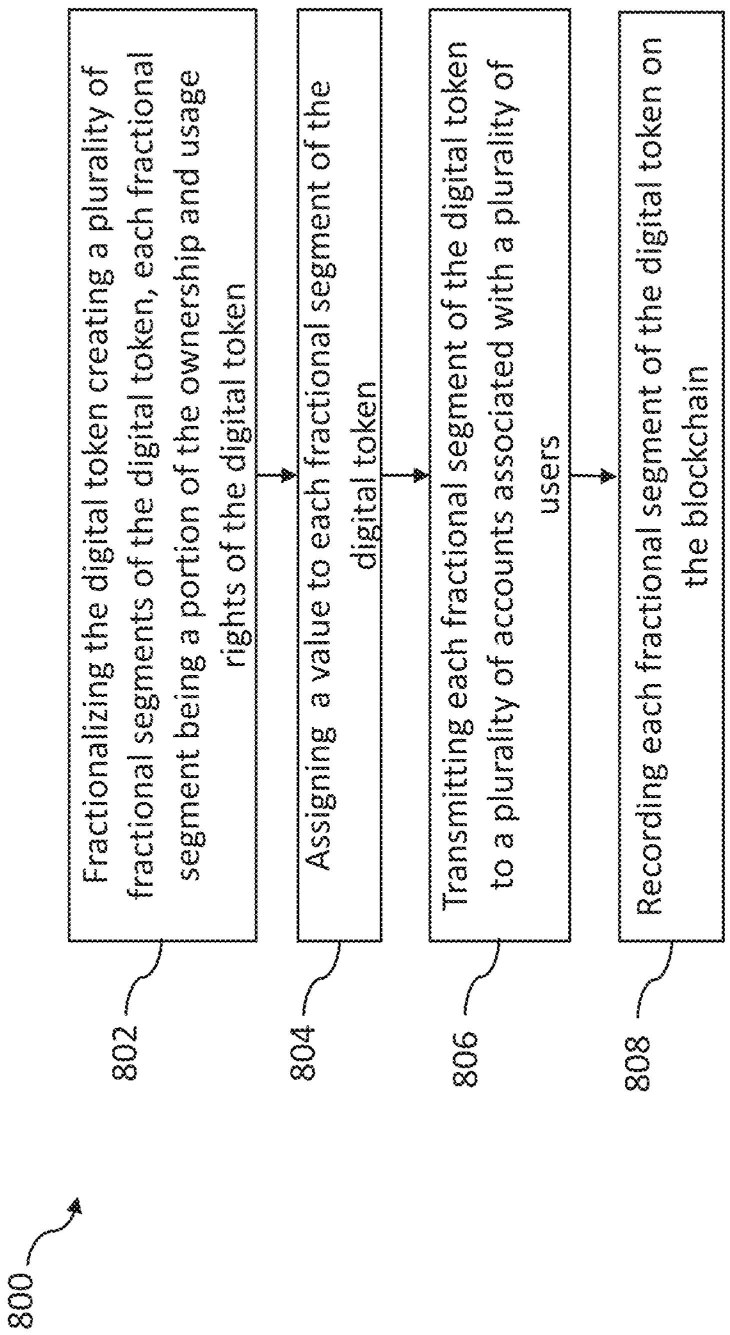
FIG. 8 is a flowchart for a method for fractionalization of an asset, in accordance with some embodiments.

Fractionalization of an asset occurs when the usage rights of the asset is divided among a plurality of users. In some embodiments, the platform system 214 allows for usage rights of an asset to be fractionalized and recorded on the blockchain. FIG. 8 is a flowchart for a method 800 for fractionalization of an asset, in accordance with some embodiments. The particular steps, order of steps, and combination of steps are shown for illustrative and explanatory purposes only. Other embodiments can implement different particular steps, orders of steps, and combinations of steps to achieve similar functions or results.

At block 802, the processor 218 fractionalizes the digital token creating a plurality of fractional segments of the digital token. Each fractional segment is a portion of the usage rights of the digital token. At block 804, the processor 218 assigns a value to each fractional segment of the digital token. At block 806, the processor 218 transmits each fractional segment of the digital token to a plurality of accounts associated with a plurality of users. For example, the digital token represents usage rights of the EOI, and the intent to register a future domain name in a forthcoming TLD registry. This can be subdivided into numerous fractional segments, with each segment being owned by an individual user, thereby enabling multiple users to collectively have usage rights of the digital token. At block 808, the processor 218 records each fractional segment of the digital token on the blockchain.

The fractional segments of the digital token may be exchanged on the marketplace though activities such as by buying, selling and trading of the asset. In some embodiments, the plurality of owners of the digital token may propose changes to the configuration, and the changes are executed based on a consensus mechanism or predefined rules among the fractional owners. In some embodiments, the fractional owners of a digital token may have different levels of access or control based on the size or type of their control fraction.

Once the expression of interest is redeemed for the future domain name in an approved TLD registry, a method for distributing revenues generated from a domain name may be implemented. The platform system 214 may calculate a revenue share for each fractional control based on their control percentage, and the revenue share is distributed to each owner's associated account or digital wallet. In some embodiments, the platform system 214 may reassemble the fractional control of the digital token where the fractional segments are combined to consolidate control back to a single entity or at least fewer entities.

In some embodiments, the digital token may have built in utility features. In particular, the digital token may include an embedded Decentralized Identifier (DID) and can be used as a form of identity without the need for a centralized authority. The DID is associated with a DID Document that contains information about the user identified by the DID including details like public keys, service endpoints, and other metadata. A resolver interacts with the DID and obtains the associated DID Document to look up and retrieve the information associated with a particular DID. The DID operates in conjunction with Verifiable Credentials (VC), which are cryptographic attestations about the claims made by the user identified by the DID. VCs allow users to present proof of certain attributes without revealing unnecessary information. The DID serves as the identifier for the user through the domain name of the digital token, and the VC provides cryptographic proof of certain attributes associated with that identifier.

Figure 9:
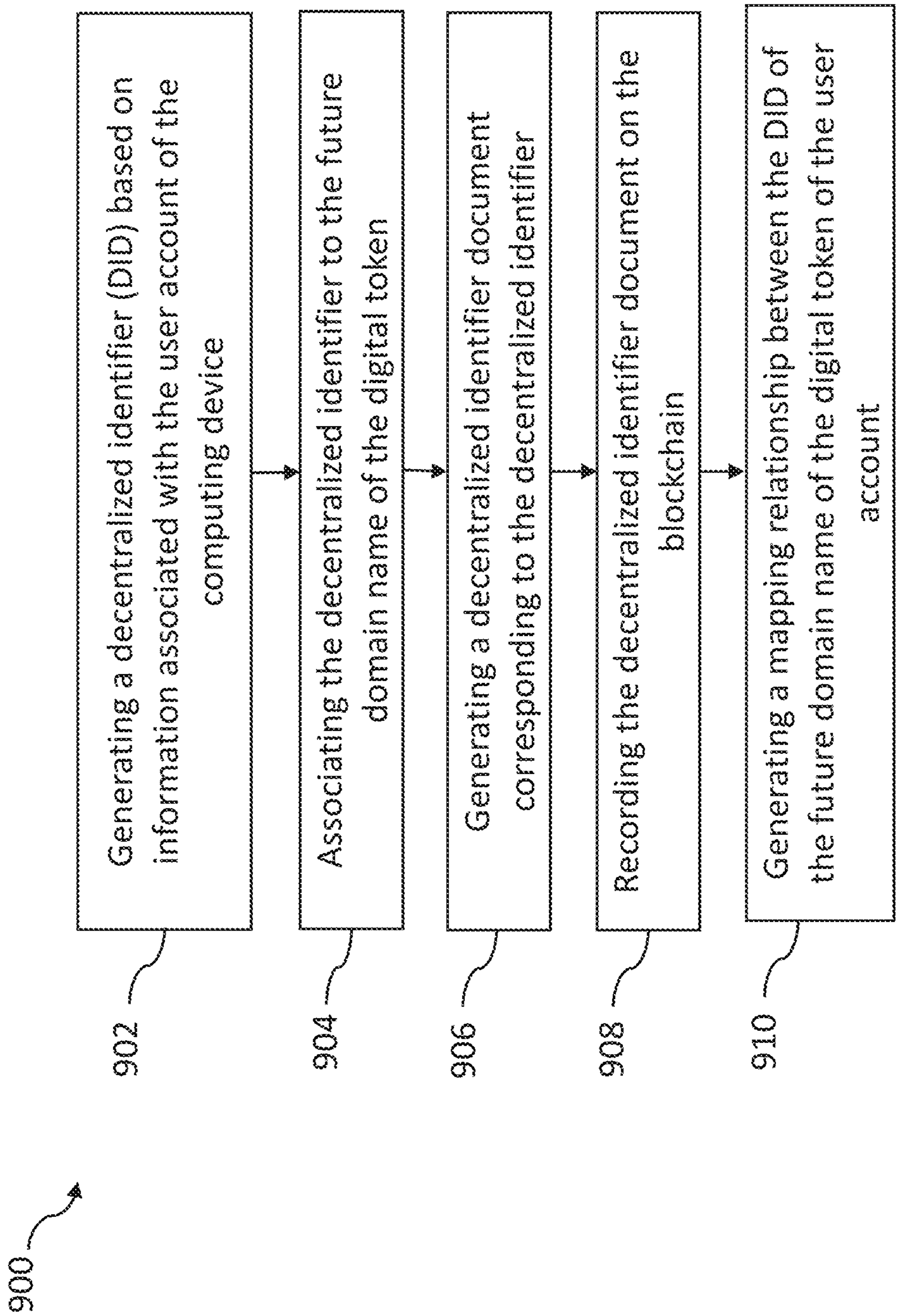
FIG. 9 is a flowchart for a method for associating a decentralized identifier to the future domain name of the digital token, in accordance with some embodiments.

FIG. 9 is a flowchart for a method 900 for associating a decentralized identifier to the future domain name of the digital token, in accordance with some embodiments. The particular steps, order of steps, and combination of steps are shown for illustrative and explanatory purposes only. Other embodiments can implement different particular steps, orders of steps, and combinations of steps to achieve similar functions or results.

At block 902, the processor 218 generates a decentralized identifier (DID) based on information associated with the user account of the computing device. The information may include answers to yes-or-no type questions to suppress particular personal identifying information so that unnecessary information is not revealed. For example, the DID may include the answer to "Are you over 21 years old?" without including a birthdate. At block 904, the processor 218 associates the decentralized identifier to the future domain name of the digital token. At block 906, the processor 218 generates a decentralized identifier document corresponding to the decentralized identifier. At block 908, the processor 218 records the decentralized identifier document on the blockchain. At block 910, the processor 218 generates a mapping relationship between the DID of the future domain name of the digital token of the user account.

A VC provider is an entity or service that issues, manages, and verifies VCs credentials in a digital identity ecosystem. The processor 218 may assign high and low value confidence scores to VC providers. The confidence score refers to the level of trust or assurance associated with the information contained in the VC. It is a measure of how confident a verifier can be in the accuracy, reliability, and integrity of the claims made in the VC. For example, a VC issued by a government agency that provides verification of the age of a citizen may have a five-star confidence score, whereas a community website allowing users to self-report their age may have a one-star confidence score.

Another built-in utility feature of the digital token may wallet services. A cryptocurrency wallet address is a unique identifier used to receive, store, and manage cryptocurrencies. It serves as a destination for funds to be sent or deposited into the wallet and is generally a representation of a user's public key, derived through cryptographic processes like hashing. The cryptocurrency wallet address is commonly an alphanumeric string. In some embodiments, the future domain name associated with the digital token may be used as a redirect for a cryptocurrency wallet that will resolve through DNS. For example, the future domain name can be mapped to a longer, more complex cryptocurrency wallet address. In this way, the future domain name can be provided to others to make it easier for them to send funds to the cryptocurrency wallet.

In some embodiments, the digital token may be assigned to various rights such as the right to receive services at a domain name or services that may be associated with a domain name. For example, the ability to have preferential rights to secure new yet to be released TLD names, website and email services, wallet and identity products, reports and analytics, promotional rewards, or as digital collateral for equity in other transactions, or used as collateral for loans. In some embodiments, the digital token may be used in association with other digital assets such as rights to phone numbers, VOIP (voice-over-IP) services, social media handles, digital wallets, QR codes, tickets and access passes. In other embodiments, a token may be issued for other non-domain names such as the right to an invitation for promotions, special events and activities, an investment opportunity, the right to an invite to a yet to be released website, product, game, experience, marketplaces, or other domain name and non-domain name related products such as a domain name marketplace.

In some embodiments, intangible rights to domain names can be divided among multiple owners through various legal mechanisms, such as assignment, licensing, or the creation of a joint control arrangement. With an assignment, the original rights holder can transfer or assign partial or complete usage rights of the domain name to one or more individuals or entities. Once the assignment is complete, the new owners have the usage rights associated with the assigned portion of the domain name.

In some embodiments, the domain name holder can also grant licenses to other parties, allowing the other parties to use the usage rights associated with the domain name including as the right to receive an email at a particular email address or Internet traffic to a specific subdomain name such as subdomain.example.com within specified terms and conditions without transferring control. Licensing agreements can be exclusive such as only one licensee is allowed to use the domain name, or non-exclusive such that multiple licensees can use the domain name. The terms of the license, such as duration, royalties, and scope of use, are negotiated between the domain name holder and the licensee. Additionally, two or more parties can become joint owners of the usage rights in the domain name. Each joint owner can have a portion of the rights and interest in the domain name.

While the present application discusses embodiments for tokenization of usage rights for new TLD names, the tokenization method discussed herein may be used in conjunction with other digital assets and products or services as well. Tokenization systems and methods discussed herein, may be implemented for any type of digital asset in which smart contracts on a blockchain are used. Other embodiments of the present inventive subject matter may also be used in conjunction with other services such as financial services including as appraisals of digital assets and/or auctions as benchmarks for valuing digital assets.

Now that embodiments of the present inventive subject matter have been shown and described in detail, various modifications and improvements thereon can become readily apparent to those skilled in the art. Accordingly, the exemplary embodiments of the present inventive subject matter, as set forth above, are intended to be illustrative, not limiting. The spirit and scope of the present inventive subject matter is to be construed broadly.

Figure 10:
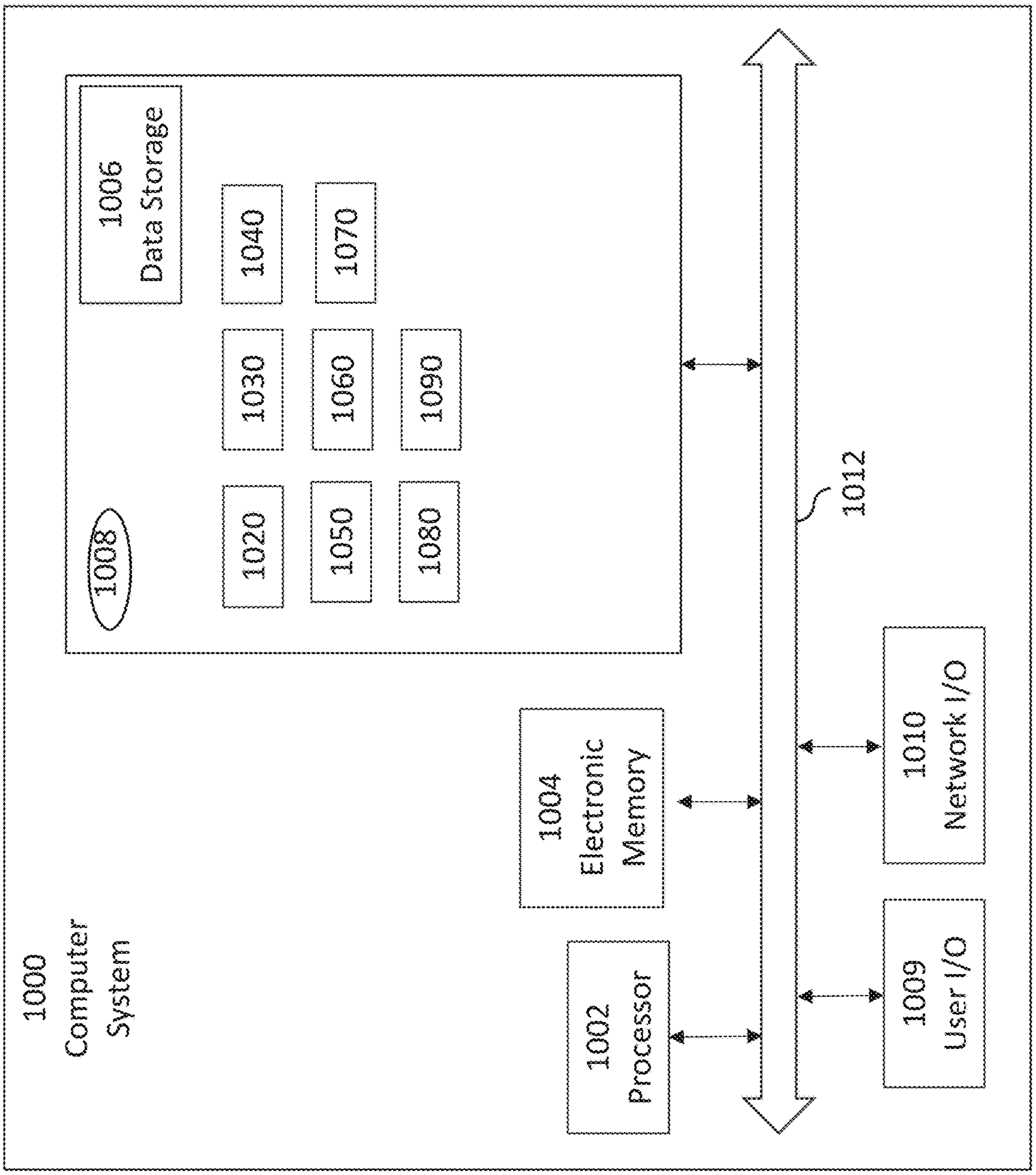
FIG. 10 is a simplified schematic diagram showing an example computer system for use in the platform system for executing any of the software programs described herein, in accordance with some embodiments.

FIG. 10 is a simplified schematic diagram showing an example computer system 1000 (representing any combination of one or more of the computer systems) for use in the platform system 214 for executing any of the software programs described herein, in accordance with some embodiments. Other embodiments may use other components and combinations of components. For example, the computer system 1000 may represent one or more physical computer devices or servers, such as web servers, rack-mounted computers, network storage devices, desktop computers, laptop/notebook computers, etc., depending on the complexity of the platform system 214. In some embodiments implemented at least partially in a cloud network potentially with data synchronized across multiple geolocations, the computer system 1000 may be referred to as one or more cloud servers. In some embodiments, the functions of the computer system 1000 are enabled in a single computer device. In more complex implementations, some of the functions of the computing system are distributed across multiple computer devices, whether within a single server farm facility or multiple physical locations. Thus, where the claims recite a "computer system", it is understood that this may refer to any of these embodiments.

In some embodiments where the computer system 1000 represents multiple computer devices, some of the functions of the computer system 1000 are implemented in some of the computer devices, while other functions are implemented in other computer devices. For example, various portions of the platform system 214 can be implemented on the same computer device or separate computer devices.

In the illustrated embodiment, the computer system 1000 generally includes at least one processor 1002, at least one main electronic memory 1004, at least one data storage 1006, at least one user I/O 1009, and at least one network I/O 1010, among other components not shown for simplicity, connected or coupled together by a data communication subsystem 1012.

The processor 1002 represents one or more central processing units on one or more PCBs (printed circuit boards) in one or more housings or enclosures. In some embodiments, the processor 1002 represents multiple microprocessor units in multiple computer devices at multiple physical locations interconnected by one or more data channels. Thus, where the claims recite a "processor", it is understood that this may refer to any of these embodiments. Additionally, when executing computer-executable instructions for performing the above-described functions of the computer system 1000 (i.e., the platform system 214) in cooperation with the main electronic memory 1004, the processor 1002 becomes a special purpose computer for performing the functions of the instructions.

The main electronic memory 1004 represents one or more RAM modules on one or more PCBs in one or more housings or enclosures. In some embodiments, the main electronic memory 1004 represents multiple memory module units in multiple computer devices at multiple physical locations. In operation with the processor 1002, the main electronic memory 1004 stores the computer-executable instructions executed by, and data processed or generated by, the processor 1002 to perform the above-described functions of the computer system 1000 (i.e., the platform system 214).

The data storage 1006 represents or comprises any appropriate number or combination of internal or external physical mass storage devices, such as hard drives, optical drives, network-attached storage (NAS) devices, flash drives, etc. In some embodiments, the data storage 1006 represents multiple mass storage devices in multiple computer devices at multiple physical locations. The data storage 1006 generally provides persistent storage (e.g., in a non-transitory computer-readable or machine-readable medium 1008) for the programs (e.g., computer-executable instructions) and data used in operation of the processor 1002 and the main electronic memory 1004. The non-transitory computer readable medium 1008 includes instructions (e.g., the programs and data 1020-1090) that, when executed by the processor 1002, cause the processor 1002 to perform operations including the above-described functions of the computer system 1000 (i.e., platform system 214).

In some embodiments, the main electronic memory 1004 and the data storage 1006 include all, or a portion of the programs and data (e.g., represented by 1020-1090) required by the processor 1002 to perform the methods, processes and functions disclosed herein (e.g., in FIGS. 2-10). Under control of these programs and using this data, the processor 1002, in cooperation with the main electronic memory 1004, performs the above-described functions for the computer system 1000 (i.e., platform system 214).

The user I/O 1009 represents one or more appropriate user interface devices, such as keyboards, pointing devices, displays, etc. In some embodiments, the user I/O 1009 represents multiple user interface devices for multiple computer devices at multiple physical locations. A system administrator, for example, may use these devices to access, set up, and control the computer system 1000.

The network I/O 1010 represents any appropriate networking devices, such as network adapters, etc. for communicating throughout the platform system 214. In some embodiments, the network I/O 1010 represents multiple such networking devices for multiple computer devices at multiple physical locations for communicating through multiple data channels.

The data communication subsystem 1012 represents any appropriate communication hardware for connecting the other components in a single unit or in a distributed manner on one or more PCBs, within one or more housings or enclosures, within one or more rack assemblies, within one or more geographical locations, etc.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only and is not intended to limit the invention.

What is claimed is:

1. A method comprising:

receiving, by a processor in a platform from a computing device associated with a user, a request having an expression of interest, the expression of interest being for an intent to register a future domain name in a Domain Name System, the future domain name being a domain name in a top-level domain that is not currently registered by a top-level domain registry;

verifying, by the processor, an account associated with the user of the computing device, wherein the verifying comprises determining that the account includes a registration credential and integrates with one or more Identity Applications to enhance security;

determining, by the processor, an availability of the future domain name by:

querying on-chain databases for occurrences of the future domain name, the on-chain databases comprised of data recorded on a blockchain; and querying off-chain databases for occurrences of the future domain name, the off-chain databases comprised of data recorded on the Domain Name System;

when the future domain name is available, allocating, by the processor, usage rights to the expression of interest, the usage rights being associated with the account of the user of the computing device;

generating, by the processor, a digital token for the expression of interest representing the usage rights of the intent to register the future domain name in a future top-level domain registry; and recording, by the processor, the digital token on the blockchain.

2. The method of claim 1, further comprising:

when the top-level domain is registered, controlling, by a registry or a registrar, the top-level domain registry and the on-chain databases, wherein the registry or the registrar is the platform;

receiving, by the processor of the platform from the computing device associated with the user, the digital token to register the future domain name in the registered top-level domain registry; and registering to the user, by the processor, the domain name associated with the digital token.

3. The method of claim 1, further comprising:

transmitting, by the processor to the computing device of the user, the digital token.

4. The method of claim 1, further comprising:

exchanging the digital token in a marketplace, wherein the exchanging is buying a for-sale digital token, selling the digital token associated with the account of the user, or trading the digital token associated with the account of the user for a for-trade digital token associated with another user account.

5. The method of claim 1, further comprising:
receiving, by the processor from the computing device associated with the user, an exchange petition, the exchange petition being for buying a for-sale digital token for a fee, the for-sale digital token representing the usage rights of the intent to register the future domain name in the future top-level domain registry;
determining, by the processor, an eligibility of the exchange petition by applying a compliance check;
when the exchange petition is eligible, debiting, by the processor, the account of the user by the fee;
transferring, by the processor, the for-sale digital token to the account of the user; and
recording, by the processor, the exchange petition on the blockchain.

6. The method of claim 1, further comprising:
receiving, by the processor from the computing device associated with the user, an exchange petition, the exchange petition being for selling the digital token associated with the account of the user for a fee;
determining, by the processor, an eligibility of the exchange petition by applying a compliance check;
when the exchange petition is eligible, crediting, by the processor, the account of the user by the fee;
transferring, by the processor, the digital token from the account of the user to another user account; and
recording, by the processor, the exchange petition on the blockchain.

7. The method of claim 1, further comprising:
receiving, by the processor from the computing device associated with the user, an exchange petition, the exchange petition being for trading the digital token associated with the account of the user for a for-trade digital token associated with another user account;
determining, by the processor, an eligibility of the exchange petition by applying a compliance check;
when the exchange petition is eligible, debiting, by the processor, the account of the user by a fee,
transferring, by the processor, the digital token associated with the account of the user to the other user account;
transferring, by the processor, the for-trade digital token associated with the other user account to the account of the user; and
recording, by the processor, the exchange petition on the blockchain.

8. The method of claim 1, further comprising:
receiving, by the processor from a plurality of computing devices associated with a plurality of users, in a set time period, a plurality of exchange petitions, each exchange petition being a bid price to buy a for-sale digital token, the for-sale digital token representing the usage rights of the intent to register the future domain name in the future top-level domain registry;
determining, by the processor, an eligibility of each exchange petition by applying a compliance check;
when the exchange petition is eligible and the set time period expires, determining a highest bid price of the plurality of exchange petitions;
debiting, by the processor, the account of the user with the highest bid price by the highest bid price;
transferring, by the processor, the for-sale digital token to the account of the user with the highest bid price; and
recording, by the processor, the exchange petition on the blockchain.

9. The method of claim 1, further comprising:
fractionalizing, by the processor, the digital token creating a plurality of fractional segments of the digital token, each fractional segment being a portion of the usage rights of the digital token;
assigning, by the processor, a value to each fractional segment of the digital token;
transmitting, by the processor, each fractional segment of the digital token to a plurality of accounts associated with a plurality of users; and
recording, by the processor, each fractional segment of the digital token on the blockchain.

10. The method of claim 1, further comprising:
generating, by the processor, a decentralized identifier (DID) based on information associated with the account of the user of the computing device;
associating, by the processor, the decentralized identifier to the future domain name of the digital token;
generating, by the processor, a decentralized identifier document corresponding to the decentralized identifier;
recording, by the processor, the decentralized identifier document on the blockchain; and
generating, by the processor, a mapping relationship between the DID of the future domain name of the digital token of the account of the user.

11. A method comprising:
receiving, by a processor from a computing device associated with a user, a request to tokenize an existing domain name in a Domain Name System, the existing domain name being a domain name in a top-level domain that is currently registered by a top-level domain registry and being associated with a numerical IP address;
verifying, by the processor, an account associated with the user of the computing device, wherein the verifying comprises determining that the account includes a registration credential and integrates with one or more Identity Applications to enhance security;
determining, by the processor, a legitimacy of the existing domain name by:
querying on-chain databases for occurrences of the existing domain name, the on-chain databases comprised of data recorded on a blockchain; and
querying off-chain databases for occurrences of the existing domain name, the off-chain databases comprised of data recorded on the Domain Name System;
when the existing domain name is legitimate, allocating, by the processor, usage rights to the existing domain name, the usage rights being associated with the account of the user of the computing device;
generating, by the processor, a digital token for the existing domain name representing the usage rights of the existing domain name in the top-level domain registry; and
recording, by the processor, the digital token on the blockchain.

12. The method of claim 11, further comprising:
receiving, by the processor from the computing device associated with the user, a communication for registration, the communication having user information;
verifying, by the processor, the user information;
when the user information is verified, registering, by the processor, the account associated with the user based on the user information;

generating, by the processor, the registration credential associated with the account; and storing, by the processor, the registration credential.

13. The method of claim 11, further comprising:

transmitting, by the processor to the computing device of the user, the digital token.

14. The method of claim 11, further comprising:

exchanging the digital token in a marketplace, wherein the exchanging is buying a for-sale digital token, selling the digital token associated with the account of the user, or trading the digital token associated with the account of the user for a for-trade digital token associated with another user account.

15. The method of claim 11, further comprising:

receiving, by the processor from the computing device associated with the user, an exchange petition, the exchange petition being for buying a for-sale digital token for a fee, the for-sale digital token representing the usage rights of the existing domain name in the top-level domain registry;

determining, by the processor, an eligibility of the exchange petition by applying a compliance check;

when the exchange petition is eligible, debiting, by the processor, the account of the user by the fee;

transferring, by the processor, the for-sale digital token to the account of the user; and recording, by the processor, the exchange petition on the blockchain.

16. The method of claim 11, further comprising:

receiving, by the processor from the computing device associated with the user, an exchange petition, the exchange petition being for selling the digital token associated with the account of the user for a fee;

determining, by the processor, an eligibility of the exchange petition by applying a compliance check;

when the exchange petition is eligible, crediting, by the processor, the account of the user by the fee;

transferring, by the processor, the digital token from the account of the user to another user account; and recording, by the processor, the exchange petition on the blockchain.

17. The method of claim 11, further comprising:

receiving, by the processor from the computing device associated with the user, an exchange petition, the exchange petition being for trading the digital token associated with the account of the user for a for-trade digital token associated with another user account;

determining, by the processor, an eligibility of the exchange petition by applying a compliance check;

when the exchange petition is eligible, debiting, by the processor, the account of the user by a fee, transferring, by the processor, the digital token associated with the account of the user to the other user account;

transferring, by the processor, the for-trade digital token associated with the other user account to the account of the user; and recording, by the processor, the exchange petition on the blockchain.

18. The method of claim 11, further comprising:

receiving, by the processor from a plurality of computing devices associated with a plurality of users, in a set time period, a plurality of exchange petitions, each exchange petition being a bid price to buy a for-sale digital token, the for-sale digital token representing the usage rights of the existing domain name in the top-level domain registry;

determining, by the processor, an eligibility of each exchange petition by applying a compliance check;

when the exchange petition is eligible and the set time period expires, determining a highest bid price of the plurality of exchange petitions;

debiting, by the processor, the account of the user with the highest bid price by the highest bid price;

transferring, by the processor, the for-sale digital token to the account of the user with the highest bid price; and recording, by the processor, the exchange petition on the blockchain.

19. The method of claim 11, further comprising:

fractionalizing, by the processor, the digital token creating a plurality of fractional segments of the digital token, each fractional segment being a portion of the usage rights of the digital token;

assigning, by the processor, a value to each fractional segment of the digital token;

transmitting, by the processor, each fractional segment of the digital token to a plurality of accounts associated with a plurality of users; and recording, by the processor, each fractional segment of the digital token on the blockchain.

20. The method of claim 11, further comprising:

generating, by the processor, a decentralized identifier (DID) based on information associated with the account of the user of the computing device;

associating, by the processor, the decentralized identifier to the existing domain name of the digital token;

generating, by the processor, a decentralized identifier document corresponding to the decentralized identifier;

recording, by the processor, the decentralized identifier document on the blockchain; and generating, by the processor, a mapping relationship between the DID of the existing domain name of the digital token of the account of the user.

* * * * *